US011770562B2

(12) United States Patent
Ray et al.

(10) Patent No.: US 11,770,562 B2
(45) Date of Patent: Sep. 26, 2023

(54) HIGH-LEVEL SYNTAX FOR GEOMETRY-BASED POINT CLOUD COMPRESSION

(71) Applicant: QUALCOMM Incorporated, San Diego, CA (US)

(72) Inventors: Bappaditya Ray, San Diego, CA (US); Adarsh Krishnan Ramasubramonian, Irvine, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/354,674

(22) Filed: Jun. 22, 2021

(65) Prior Publication Data

US 2021/0400308 A1 Dec. 23, 2021

Related U.S. Application Data

(60) Provisional application No. 63/090,027, filed on Oct. 9, 2020, provisional application No. 63/043,032, filed on Jun. 23, 2020.

(51) Int. Cl.
*H04N 19/70* (2014.01)
*H04N 19/157* (2014.01)
*H04N 19/184* (2014.01)

(52) U.S. Cl.
CPC ........... *H04N 19/70* (2014.11); *H04N 19/157* (2014.11); *H04N 19/184* (2014.11)

(58) Field of Classification Search
CPC ..... H04N 19/70; H04N 19/157; H04N 19/184
See application file for complete search history.

(56) References Cited

U.S. PATENT DOCUMENTS

| 10,860,212 | B1 * | 12/2020 | Chinthekindi | ........ G06F 16/185 |
| 2017/0345207 | A1 * | 11/2017 | Seiler | ........................ G06T 1/20 |
| 2019/0384864 | A1 * | 12/2019 | Ganti | .................... G06F 16/901 |
| 2020/0302680 | A1 * | 9/2020 | Yip | ...................... G06T 15/205 |
| 2021/0209812 | A1 * | 7/2021 | Han | ................... H04N 19/1883 |

(Continued)

OTHER PUBLICATIONS

"G-PCC Future Enhancements", 130, MPEG Meeting, Apr. 20, 2020-Apr. 24, 2020, Alpbach, (Motion Picture Expert Group or ISO/IEC JTC1/SC29/WG11), No. n19328, Jul. 21, 2020, XP030289574, 140 Pages.

(Continued)

*Primary Examiner* — Fabio S Lima
(74) *Attorney, Agent, or Firm* — QUALCOMM Incorporated; Espartaco Diaz Hidalgo

(57) ABSTRACT

An apparatus configured for point cloud compression may be configured to code a first syntax element indicating a number of bits used to encode one or more second syntax elements, wherein the one or more second syntax elements indicate one or more of an offset of a bounding box, an origin point of the bounding box, a size of the bounding box, or a number of unique segments. The apparatus may code the first syntax element using an exponential Golomb code. The apparatus may further code the one or more second syntax elements using a fixed length code based on the number of bits indicated by the first syntax element, and code the point cloud based on the decoded one or more second syntax elements.

48 Claims, 5 Drawing Sheets

(56) References Cited

U.S. PATENT DOCUMENTS

| | | | |
|---|---|---|---|
| 2021/0218994 A1* | 7/2021 | Flynn | G06T 9/001 |
| 2021/0289211 A1* | 9/2021 | Oh | H04N 19/186 |
| 2021/0295567 A1* | 9/2021 | Lee | G06T 9/001 |
| 2021/0326734 A1* | 10/2021 | Van der Auwera | H04N 19/597 |
| 2021/0329052 A1* | 10/2021 | Oh | H04L 65/61 |
| 2021/0329055 A1* | 10/2021 | Hur | H04L 65/70 |
| 2021/0377566 A1* | 12/2021 | Iguchi | H04N 19/597 |
| 2021/0400280 A1* | 12/2021 | Zaghetto | G06T 9/00 |
| 2021/0400292 A1* | 12/2021 | Choi | H04N 19/167 |
| 2021/0407142 A1* | 12/2021 | Hur | G06T 9/40 |
| 2022/0114763 A1 | 4/2022 | Ray et al. | |
| 2022/0256190 A1* | 8/2022 | Hur | G06T 9/40 |

OTHER PUBLICATIONS

ITTF Via SC 29 Secretariat: Summary of Voting on ISO/IEC DIS 23090-9, 132. MPEG Meeting, Oct. 12, 2020-Oct. 16, 2020, Online, (Motion Picture Expert Group or ISO/IEC JTC1/SC29/WG11), No. m54899 Sep. 18, 2020 (Sep. 18, 2020), XP030292349, Retrieved from the Internet: URL: https://dms.mpeg.expert/doc_end_user/documents/132_OnLine/wg11/m54899-v1-m54899.zip CommentFiles/ISO_IEC DIS 23090-9 Collated Comments.doc [retrieved on Sep. 18, 2020].

Lasserre (Blackberry), S., et al., "M52958 [GPCC] [CE 13. 22] Report on Azimuthal Coding Mode", 130. MPEG Meeting, Apr. 20, 2020-Apr. 24, 2020, Alpbach, (Motion Picture Expert Group or ISO/IEC JTC1/SC29/WG11), No. m52958 Mar. 18, 2020, XP030285279, 3 Pages.

Oh, H-M., (LGE), et al., "[G-PCC] EE13.43 Report on Coordinate Conversion", 132. MPEG Meeting, Oct. 12, 2020-Oct. 16, 2020, Online, (Motion Picture Expert Group or ISO/IEC JTC1/WG7), No. m55349, Oct. 7, 2020 (Oct. 7, 2020), XP030292862, pp. 1-4, Retrieved from the Internet: URL: https://dms.mpeg.expert/doc_end_user/documents/132_OnLine/wg7/m55349-v1-m55349.zip m55349 EE13.43 report on coordinate conversion.docx [retrieved on Oct. 7, 2020].

Ray B., et al.,"[G-PCC] [new] Misc. High Level Syntax Refinements for G-PCC", International Organisation for Standardisation Organisation Internationale DE Normalisation ISO/IEC JTC 1/SC 29/WG 7 Coding of Moving Pictures and Audio, ISO/IEC JTC 1/SC 29/WG 7 m 55378, Oct. 2020, 15 Pages.

Ray, B., (QUALCOMM), et al., "[G-PCC] [new] Angular HLS Improvement and Bugfix", 131. MPEG Meeting, Jun. 29, 2020-Jul. 3, 2020, Online, (Motion Picture Expert Group or ISO/IEC JTC1/SC29/WG11), No. m54702, Jun. 23, 2020 (Jun. 23, 2020), XP030289275, 8 Pages.

"Text of ISO/IEC 23090-9 DIS Geometry-Based Point Cloud Compression", 129. MPEG Meeting, Jan. 13, 2020-Jan. 17, 2020, Brussels, (Motion Picture Expert Group or ISO/IEC JTC1/SC29/WG11), No. n19088, Apr. 20, 2020 (Apr. 20, 2020), XP030287970, 126 Pages, Retrieved from the Internet: URL:http://phenix.int-evry.fr/mpeg/doc_end_user/documents/129_Brussels/wg11/w19088.zip w19088_d10_clean.pdf [retrieved on-Apr. 20, 2020].

WG 7, MPEG 3D Graphics Coding: "G-PCC Codec Description v11", International Organization for Standardization Organisation Internationale DE Normalisation ISO/IEC JTC 1/SC 29/WG 7 MPEG 3D Graphics Coding, ISO/IEC JTC 1/SC 29/WG 7 N0099, Apr. 2021, 153 Pages.

3DG: "CE4FE 13.29 Geometry Quantization QP Control", 129. MPEG Meeting, Jan. 13, 2020-Jan. 17, 2020, Brussels, (Motion Picture Expert Group or ISO/IEC JTC1/SC29/WG11), No. N19113, Mar. 25, 2020 (Mar. 25, 2020), 5 Pages, XP030285359, Retrieved from the Internet: URL: http://phenix.int-evry.fr/mpeg/doc_end_user/documents/129_Brussels/wg11/w19113.zip, w19113_CE13_29 Geometry_Quantization_QP_control.docx [retrieved on Mar. 25, 2020].

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

3BG: "G-PCC Future Enhancements", International Organisation for Standardisation Organisation Internationale De Normalisation, ISO/IEC JTC 1/SC 29/WG 11 Coding of Moving Pictures and Audio, ISO/IEC JTC 1/SC 29/WG 11, N18887, Geneva, CH—Oct. 2019, 128. MPEG Meeting, Oct. 7, 2019-Oct. 11, 2019, Geneva, (Motion Picture Expert Group or ISO/IEC JTC1/SC29/WG11), No. n18887, Dec. 23, 2019, XP030225587, 277 Pages.

3DG: "G-PCC Test Model v9", 129. MPEG Meeting, Jan. 13, 2020-Jan. 17, 2020, Brussels, (Motion Picture Expert Group or ISO/IEC JTC1/SC29/WG11), No. N19083, Apr. 9, 2020 (Apr. 9, 2020), 15 Pages, XP030287963, Retrieved from the Internet: URL: http://phenix.int-evry.fr/mpeg/doc_end_user/documents/129_Brussels/wg11/w19083.zip w19083.pdf, [retrieved on Apr. 9, 2020].

Lasserre S., (Blackberry) et al., "[GPCC] [CE 13.22 ] Report on Angular Coding Mode", 129. MPEG Meeting, Jan. 13, 2020-Jan. 17, 2020, Brussels, (Motion Picture Expert Group or ISO/IEC JTC1/SC29/WG11). No. M51594, Jan. 8, 2020, XP030224657, 4 Pages.

Ramasubramonian A.K., (Qualcomm) et al., "[G-PCC] Normative Bounding Box and Global Scaling for Point Clouds". 131. MPEG Meeting, Jun. 29, 2020-Jul. 3, 2020, Online, (Motion Picture Expert Group or ISO/IEC JTC1/SC29/WG11) No. m54584, Jun. 20, 2020, XP030289056, 16 Pages.

Ray, B., (Qualcomm) et al., "[G-PCC] [New] Various HLS Fixes and Improvements", 132. MPEG Meeting, Oct. 12, 2020-Oct. 16, 2020, Online, (Motion Picture Expert Group or ISO/IEC JTC1/SC29/WG11), No. m55378 Oct. 10, 2020 (Oct. 10, 2020), XP030291890, Retrieved from the Internet: URL: https://dms.mpeg.expert/doc_end_user/documents/132_OnLine/wg11/m55378-v1-m55378-v1.zip m55378-v1/m55378-v1.docx [retrieved on Oct. 10, 2020].

"Report of the 129th Meeting", 130. MPEG Meeting, Apr. 20, 2020-Apr. 24, 2020, Alpbach, (Motion Picture Expert Group or ISO/IEC JTC1/SC29/WG11), No. n19173, May 24, 2020 (May 24, 2020), XP030285445, Retrieved from the Internet URL: http://phenixint-evry.fr/mpeg/doc_end_user/documents/130_Alpbach/wg11/w19173.zip w19173—report.docx, [retrieved on May 24, 2020].

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

International Search Report and Written Opinion—PCT/US2021/038603—ISA/EPO—dated Sep. 10, 2021.

* cited by examiner

HIGH-LEVEL SYNTAX FOR GEOMETRY-BASED POINT CLOUD COMPRESSION

This application claims the benefit of U.S. Provisional Patent Application No. 63/043,032, filed Jun. 23, 2020, and U.S. Provisional Patent Application No. 63/090,027, filed Oct. 9, 2020, the entire content of each of which is incorporated by reference herein.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for coding attribute residuals of point clouds. The techniques of this disclosure may be used in any point cloud compression techniques, including the Geometry Point Cloud Compression (G-PCC) standard that is currently developed.

In a more specific example of the disclosure, a geometry point cloud encoder and decoder may be configured to code a first syntax element that indicates the number of bits used to code a second syntax element related to attribute coding. The video coder may code the first syntax element using an exponential Golomb code. The video coder may then code the second syntax element using a fixed length code according to the number of bits indicated by the first syntax element. Examples of syntax elements that may be coded using a fixed length code according to a number of bits indicated by a first syntax element may include one or more of an offset of a bounding box, an origin point of the bounding box, a size of the bounding box, or a number of unique segments. By using the techniques of this disclosure, the number of bits needed to code the second syntax element may be substantially lower than only coding the second syntax element using an exponential Golomb code. As such, coding efficiency may be improved.

In one example, this disclosure describes a method for decoding a point cloud, the method comprising decoding a first syntax element indicating a number of bits used to encode one or more second syntax elements, wherein the one or more second syntax elements indicate one or more of an offset of a bounding box, an origin point of the bounding box, a size of the bounding box, or a number of unique segments, decoding the one or more second syntax elements using a fixed length code based on the number of bits indicated by the first syntax element, and decoding the point cloud based on the decoded one or more second syntax elements.

In another example, this disclosure describes an apparatus configured to decode a point cloud, the apparatus comprising a memory, and one or more processors implemented in circuitry and in communication with the memory, the one or more processors configured to decode a first syntax element indicating a number of bits used to encode one or more second syntax elements, wherein the one or more second syntax elements indicate one or more of an offset of a bounding box, an origin point of the bounding box, a size of the bounding box, or a number of unique segments, decode the one or more second syntax elements using a fixed length code based on the number of bits indicated by the first syntax element, and decode the point cloud based on the decoded one or more second syntax elements.

In another example, this disclosure describes a method of encoding a point cloud, the method comprising encoding a first syntax element indicating a number of bits used to encode one or more second syntax elements, wherein the one or more second syntax elements indicate one or more of an offset of a bounding box, an origin point of the bounding box, a size of the bounding box, or a number of unique segments, and encoding the one or more second syntax elements using a fixed length code and the number of bits.

In another example, this disclosure describes an apparatus configured to encode a point cloud, the apparatus comprising a memory, and one or more processors implemented in circuitry and in communication with the memory, the one or more processors configured to encode a first syntax element indicating a number of bits used to encode one or more second syntax elements, wherein the one or more second syntax elements indicate one or more of an offset of a bounding box, an origin point of the bounding box, a size of the bounding box, or a number of unique segments, and encode the one or more second syntax elements using a fixed length code using the number of bits.

In another example, this disclosure describes an apparatus configured to decode point cloud data, the apparatus comprising means for decoding a first syntax element indicating a number of bits used to encode one or more second syntax elements, wherein the one or more second syntax elements indicate one or more of an offset of a bounding box, an origin point of the bounding box, a size of the bounding box, or a number of unique segments, means for decoding the one or more second syntax elements using a fixed length code based on the number of bits indicated by the first syntax element, and means for decoding the point cloud based on the decoded one or more second syntax elements.

In another example, this disclosure describes a non-transitory computer-readable storage medium storing instructions that, when executed, cause one or more processors configured to decode point cloud data to decode a first syntax element indicating a number of bits used to encode one or more second syntax elements, wherein the one or more second syntax elements indicate one or more of an offset of a bounding box, an origin point of the bounding box, a size of the bounding box, or a number of unique segments, decode the one or more second syntax elements using a fixed length code based on the number of bits indicated by the first syntax element, and decode the point cloud based on the decoded one or more second syntax elements.

In another example, this disclosure describes an apparatus configured to encode point cloud data, the apparatus comprising means for encoding a first syntax element indicating a number of bits used to encode one or more second syntax elements, wherein the one or more second syntax elements indicate one or more of an offset of a bounding box, an origin point of the bounding box, a size of the bounding box, or a number of unique segments, and means for encoding the one or more second syntax elements using a fixed length code and the number of bits.

In another example, this disclosure describes a non-transitory computer-readable storage medium storing instructions that, when executed, cause one or more processors configured to encode point cloud data to encode a first syntax element indicating a number of bits used to encode one or more second syntax elements, wherein the one or more second syntax elements indicate one or more of an offset of a bounding box, an origin point of the bounding box, a size of the bounding box, or a number of unique segments, and encode the one or more second syntax elements using a fixed length code using the number of bits.

The details of one or more examples are set forth in the accompanying drawings and the description below. Other features, objects, and advantages will be apparent from the description, drawings, and claims.

DETAILED DESCRIPTION

In example geometry point cloud compression techniques, various syntax elements may be encoded and decoded that define various bounding boxes, slices, tiles, and other regions associated with encoding and decoding the positions and/or attributes of point cloud data. In some examples, such syntax elements are coded using an exponential Golomb code. In some instances, the values of such syntax elements may become very large when coded with an exponential Golomb code. In order to reduce the overall number of bits needed to code such syntax elements, this disclosure describes syntax element coding techniques that may reduce signaling overhead.

In one example of the disclosure, a geometry point cloud encoder and decoder may be configured to code a first syntax element that indicates the number of bits used to code a second syntax element related to attribute coding. The video coder may code the first syntax element using an exponential Golomb code. The video coder may then code the second syntax element using a fixed length code according to the number of bits indicated by the first syntax element. Examples of syntax elements that may be coded using a fixed length code according to a number of bits indicated by a first syntax element may include one or more of an offset of a bounding box, an origin point of the bounding box, a size of the bounding box, or a number of unique segments. By using the techniques of this disclosure, the number of bits needed to code the second syntax element may be substantially lower than only coding the second syntax element using an exponential Golomb code. As such, coding efficiency may be improved.

Figure 1:
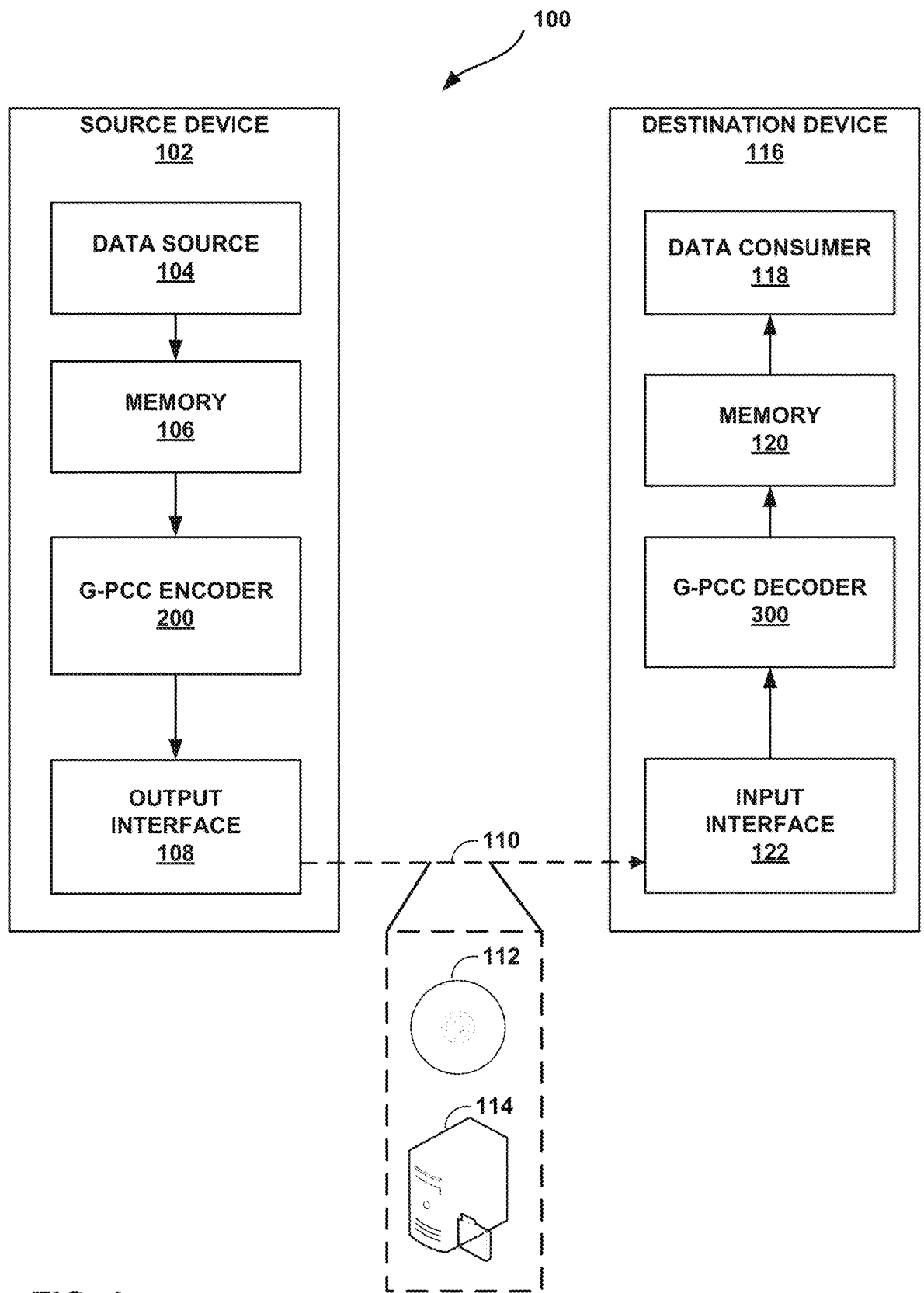
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to coding high-level syntax. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to coding high-level syntax. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19328, Alpbach, Austria, June 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
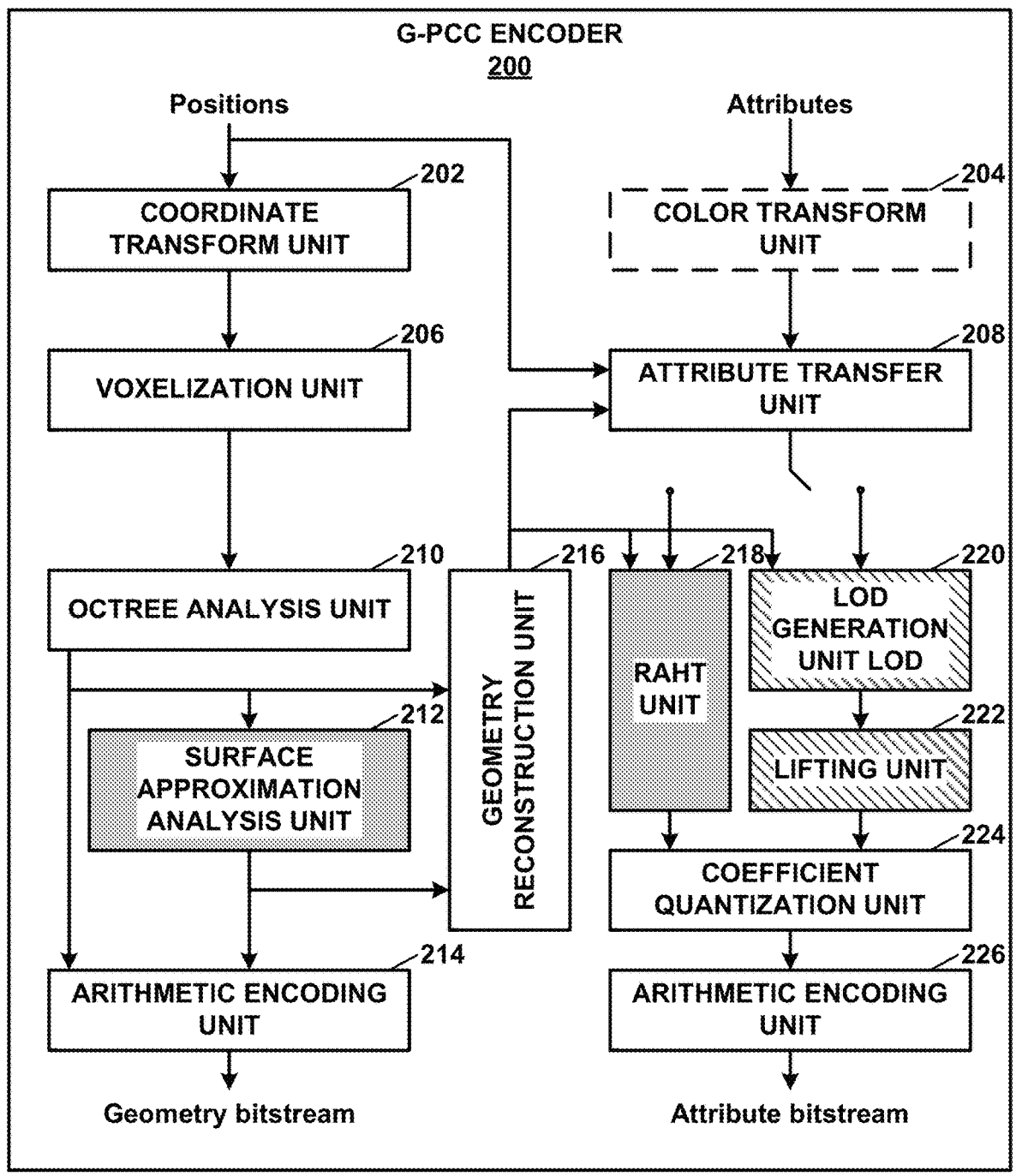
FIG. 2 is a block diagram illustrating an example Geometry Point Cloud Compression (G-PCC) encoder configured to perform the techniques of this disclosure.
Figure 3:
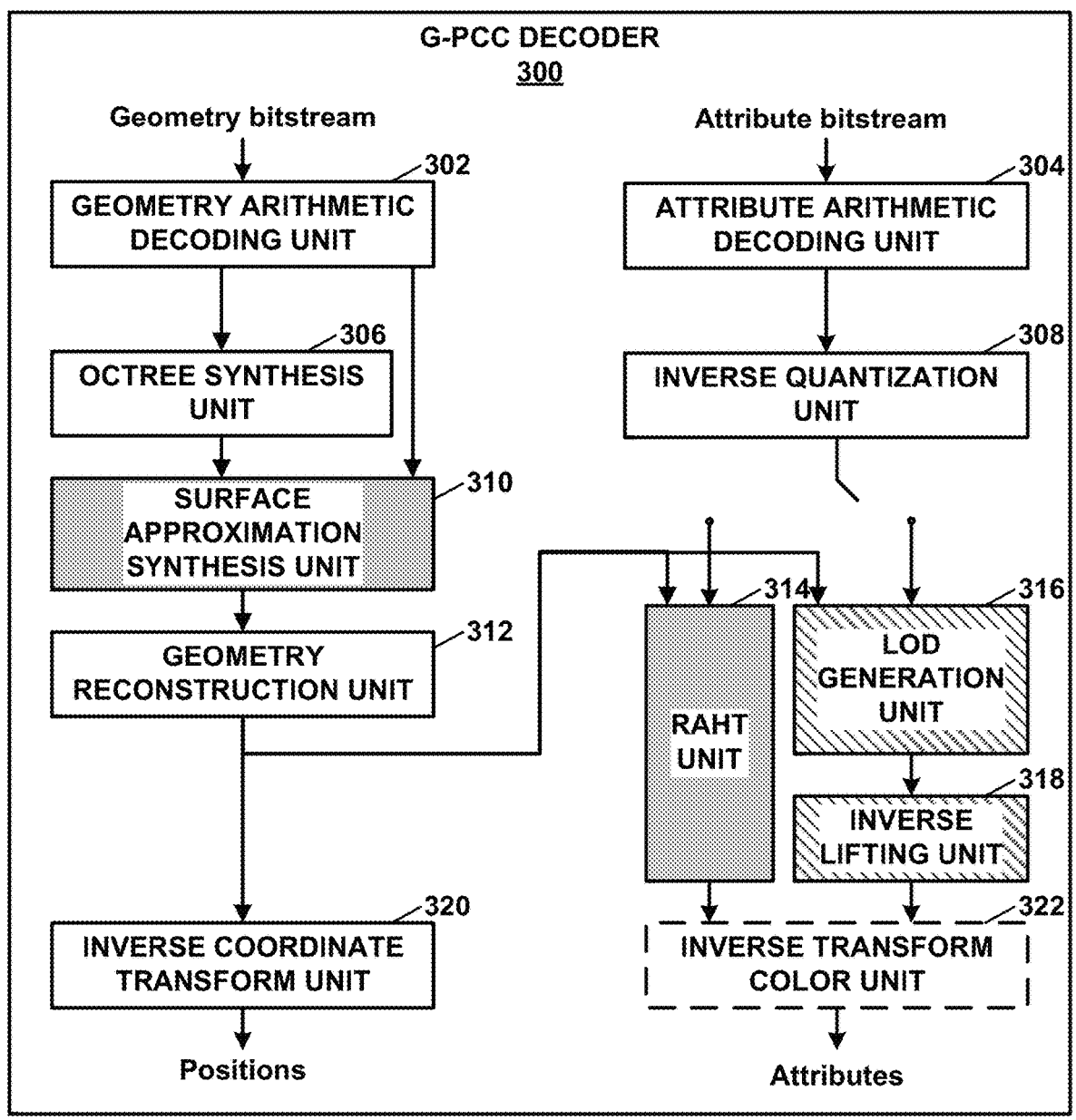
FIG. 3 is a block diagram illustrating an example G-PCC decoder configured to perform the techniques of this disclosure.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

As will be explained in more detail below, G-PCC encoder 200 is an example of a device that may be configured to encode a first syntax element indicating a number of bits used to encode one or more second syntax elements, wherein the one or more second syntax elements indicate one or more of an offset of a bounding box, an origin point of the bounding box, a size of the bounding box, or a number of unique segments, and encode the one or more second syntax elements using a fixed length code using the number of bits.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children nodes at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in a G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

As will be explained in more detail below, G-PCC decoder 300 is an example of a device that may be configured to decode a first syntax element indicating a number of bits used to encode one or more second syntax elements, wherein the one or more second syntax elements indicate one or more of an offset of a bounding box, an origin point of the bounding box, a size of the bounding box, or a number of unique segments, decode the one or more second syntax elements using a fixed length code based on the number of bits indicated by the first syntax element, and decode a point cloud based on the decoded one or more second syntax elements.

In this disclosure, high-level syntax improvements for G-PCC are described in multiple examples. In some examples, the techniques of this disclosure may reduce the number of times a particular syntax element is encoded and subsequently decoded. In other examples, the techniques of this disclosure may reduce the number of bits used to encode certain syntax elements relative to previous techniques, thus lowering coding overhead and improving compression. The example techniques described below can be used independently or may be combined in any way. That is, the techniques below are not mutually exclusive, and any number of the below techniques may be used together.

Example 1: Coding geom_planar_mode_th_idcm

In one example of G-PCC, G-PCC encoder 200 may signal, in a geometry parameter set (GPS), the geom_planar_mode_th_idcm syntax element irrespective of whether the inferred direct coding mode (IDCM) is enabled or not. The geom_planar_mode_th_idcm syntax element indicates a threshold value for determining whether to use IDCM for coding the geometry of a point cloud. IDCM is a coding technique for directly coding the positions of the geometry of a point cloud.

As shown below, whether or not IDCM mode is enabled is indicated by the inferred_direct_coding_mode_enabled_flag. As shown below, in one example of G-PCC, geom_planar_mode_th_idcm is signaled regardless of the value of inferred_direct_coding_mode_enabled_flag. This may result in situations where the geom_planar_mode_th_idcm is signaled even though IDCM is not enabled. As such, G-PCC decoder 300 would decode a syntax element that would not be used.

| | |
|---|---|
| unique_geometry_points_flag | u(1) |
| geometry_planar_mode_flag | u(1) |
| if( geometry_planar_mode_flag ){ | |
|   geom_planar_mode_th_idcm | ue(v) |
|   geom_planar_mode_th[ 0 ] | ue(v) |
|   geom_planar_mode_th[ 1 ] | ue(v) |
|   geom_planar_mode_th[ 2 ] | ue(v) |
|   geometry_angular_mode_flag | u(1) |
| } | |
| if( geometry_angular_mode_flag ){ | |
|   for( k = 0; k < 3; k++ ) | |
|     geom_angular_origin_xyz[ k ] | se(v) |
|   number_lasers_minus1 | ue(v) |
|   laser_angle[ 0 ] | se(v) |
|   laser_correction[ 0 ] | ue(v) |
|   for( i = 1; i <= number_lasers_minus1; i++ ) { | |
|     laser_angle_diff[ i ] | ue(v) |
|     laser_correction_diff[ i ] | se(v) |
|   } | |
|   planar_buffer_disabled_flag | u(1) |
| } | |
| neighbour_context_restriction_flag | u(1) |
| inferred_direct_coding_mode_enabled_flag | u(1) |

This disclosure proposes that G-PCC encoder 200 be configured to encode and signal the IDCM mode flag (e.g., the inferred_direct_coding_mode_enabled_flag) prior to the geom_planar_mode_th_IDCM syntax element, and condition the encoding of the geom_planar_mode_th_IDCM syntax element based on the inferred_direct_coding_mode_enabled_flag being true. Likewise, G-PCC decoder 300 may be configured to parse and decode the IDCM mode flag (e.g., the inferred_direct_coding_mode_enabled_flag) prior to the geom_planar_mode_th_IDCM syntax element, and condition the parsing and decoding of the geom_planar_mode_th_IDCM syntax element based on the inferred_direct_coding_mode_enabled_flag being true. The modified syntax is shown below, with additions to the G-PCC syntax shown between the labels <ADD> and </ADD> and deletions from the G-PCC syntax shown between the labels <DEL> and </DEL>.

| | |
|---|---|
| unique_geometry_points_flag | u(1) |
| <ADD>inferred_direct_coding_mode_enabled_flag | u(1) |
| | </ADD> |
| geometry_planar_mode_flag | u(1) |
| if( geometry_planar_mode_flag ){ | |
|   <ADD> if(inferred_direct_mode_enabled_flag) </ADD> | |
|     geom_planar_mode_th_idcm | ue(v) |
|   geom_planar_mode_th[ 0 ] | ue(v) |
|   geom_planar_mode_th[ 1 ] | ue(v) |
|   geom_planar_mode_th[ 2 ] | ue(v) |
|   geometry_angular_mode_flag | u(1) |
| } | |
| if( geometry_angular_mode_flag ){ | |
|   for( k = 0; k < 3; k++ ) | |
|     geom_angular_origin_xyz[ k ] | se(v) |
|   number_lasers_minus1 | ue(v) |
|   laser_angle[ 0 ] | se(v) |
|   laser_correction[ 0 ] | ue(v) |
|   for( i = 1; i <= number_lasers_minus1; i++ ) { | |
|     laser_angle_diff[ i ] | ue(v) |
|     laser_correction_diff[ i ] | se(v) |
|   } | |
|   planar_buffer_disabled_flag | u(1) |
| } | |
| neighbour_context_restriction_flag | u(1) |
| </DEL> inferred_direct_coding_mode_enabled_flag | u(1) </DEL> |

Accordingly, in one example of the disclosure, G-PCC encoder 200 may be configured to encode a syntax element indicating whether an inferred direct coding mode (IDCM) is enabled, and encode a syntax element indicating a threshold for a planar mode based on the syntax element indicating that IDCM is enabled. Likewise, G-PCC decoder 300 may be configured to decode a syntax element indicating whether an inferred direct coding mode (IDCM) is enabled, and decode a syntax element indicating a threshold for a planar mode based on the syntax element indicating that IDCM is enabled.

Example 2: Coding geom_direct_coding_mode_qp_offset

In one example of G-PCC, when geometry scaling is enabled, a quantization parameter (QP) offset for the IDCM mode (geom_direct_coding_mode_qp_offset) for IDCM nodes is signaled in a GPS irrespective of whether IDCM is enabled or not, as shown below.

| | |
|---|---|
| geom_scaling_enabled_flag | u(1) |
| if( geom_scaling_enabled_flag ) { | |
|     geom_base_qp | ue(v) |
|     geom_direct_coding_mode_qp_offset | se(v) |
| } | |

This disclosure proposes that G-PCC encoder 200 and G-PCC decoder 300 only code geom_direct_coding_mode_qp_offset when IDCM is enabled. The modified syntax is shown below.

| | |
|---|---|
| geom_scaling_enabled_flag | u(1) |
| if( geom_scaling_enabled_flag ) { | |
|     geom_base_qp | ue(v) |
|     <ADD>    if(inferred_direct_mode_enabled_flag)</ADD> | |
|     geom_direct_coding_mode_qp_offset | se(v) |
| } | |

Accordingly, in one example of the disclosure, G-PCC encoder 200 may be configured to encode a syntax element indicating whether an inferred direct coding mode (IDCM) is enabled, and encode a syntax element indicating a quantization parameter (QP) offset for the IDCM mode based on the syntax element indicating that IDCM is enabled. Likewise, G-PCC decoder 300 may be configured to decode a syntax element indicating whether an inferred direct coding mode (IDCM) is enabled, and decode a syntax element indicating a quantization parameter (QP) offset for the IDCM mode based on the syntax element indicating that IDCM is enabled.

Example 3: On Semantics of LoD Parameter in Adaptation Parameter Set (APS)

In one example of G-PCC, in an APS, G-PCC encoder 200 signals LoD values in an affine predictive way by applying a scale and offset on top of a previous LoD value. For example:

LiftingSamplingDistanceSquared[$idx$]=(lifting_sampling_distance_squared_scale_minus1[$idx$]+1)× LiftingSamplingDistanceSquared[$idx$−1]+lifting_sampling_distance_squared_offset[$idx$]

The corresponding semantics in the G-PCC DIS text are shown below.

lifting_sampling_distance_squared_scale_minus1[idx] plus 1 specifies the scaling factor for the derivation of the square of the sampling distance for the level of detail idx. The value of lifting_sampling_distance_squared_scale_minus1[idx] shall be in the range of 0 to xx. When lifting_sampling_distance_squared_scale_minus1[idx] is not present in the bitstream, it is inferred to be 0.

lifting_sampling_distance_squared_offset[idx] specifies the offset for the derivation of the square of the sampling distance for the level of detail idx. The value of lifting_sampling_distance_squared_offset[idx] shall be in the range of 0 to xx. When lifting_sampling_distance_squared_offset[idx] is not present in the bitstream, it is inferred to be 0.

The variable LiftingSamplingDistanceSquared[idx] for idx=0 . . . num_detail_level_minus1−1, specifying the sampling distance for the level of detail idx, are derived as follows:

```
LiftingSamplingDistanceSquared[0] =
  lifting_sampling_distance_squared_scale_minus1[0] + 1
for (idx = 1; idx < num_detail_level_minus1; idx++) {
  LiftingSamplingDistanceSquared[idx] =
  (lifting_sampling_distance_squared_scale_minus1[idx] + 1)
  × LiftingSamplingDistanceSquared[idx − 1]
  + lifting_sampling_distance_squared_offset[idx]
}
```

However, LoD distance values are strictly increasing (otherwise refinement level shall not be nonzero). Thus, the scale and offset cannot be respectively 1 and 0, as it would indicate the LoD distance values for two consecutive LoD's would be the same. Thus, this case should not occur. Accordingly, this disclosure proposes that G-PCC encoder 200 and G-PCC decoder 300 operate according to the altered semantics shown below.

lifting_sampling_distance_squared_scale_minus1[idx] plus 1 specifies the scaling factor for the derivation of the square of the sampling distance for the level of detail idx. The value of lifting_sampling_distance_squared_scale_minus1[idx] shall be in the range of 0 to xx. When lifting_sampling_distance_squared_scale_minus1[idx] is not present in the bitstream, it is inferred to be 0.

lifting_sampling_distance_squared_offset[idx] specifies the offset for the derivation of the square of the sampling distance for the level of detail idx. The value of lifting_sampling_distance_squared_offset[idx] shall be in the range of 0 to xx. When lifting_sampling_distance_squared_offset[idx] is not present in the bitstream, it is inferred to be 0.

The variable LiftingSamplingDistanceSquared[idx] for idx=0 . . . num_detail_level_minus1−1, specifying the sampling distance for the level of detail idx, are derived as follows:

```
LiftingSamplingDistanceSquared[0] =
lifting_sampling_distance_squared_scale_minus1[0] + 1
  for (idx = 1; idx < num_detail_level_minus1; idx++) {
    LiftingSamplingDistanceSquared[idx] =
    (lifting_sampling_distance_squared_scale_minus1[idx] + 1)
    × LiftingSamplingDistanceSquared[idx − 1]
    + lifting_sampling_distance_squared_offset[idx]
  }
```

<ADD> It is a requirement of the bitstream conformance that lifting_sampling_distance_squared_scale_minus1[idx] and lifting_sampling_distance_squared_offset[idx] both can't be 0 for idx=1 . . . num_detail_level_minus_1.</ADD>

Alternatively:
<ADD>LiftingSamplingDistanceSquared[idx]<Lifting-SamplingDistanceSquared[idx−1] for idx=1 . . . num_detail_level_minus1.</ADD>

Example 4: On Semantics of lifting_adaptive_prediction_threshold

In one example of G-PCC, the semantics of the syntax element lifting_adaptive_prediction_threshold do not specify the upper bound, as shown below.

lifting_adaptive_prediction_threshold specifies the threshold to enable adaptive prediction. The value of lifting_adaptive_prediction_threshold[ ] shall be in the range of 0 to xx. When not present, the value of lifting_adaptive_prediction_threshold is inferred to be 0.

The variable AdaptivePredictionThreshold specifying the threshold to switch to adaptive predictor selection mode is set equal to lifting_adaptive_prediction_threshold.

This threshold is computed using a max variation over all the color components. This disclosure proposes that G-PCC encoder 200 and G-PCC decoder 300 can set the upper bound of this threshold from the bitdepth of primary and secondary components, as follows:

lifting_adaptive_prediction_threshold specifies the threshold to enable adaptive prediction. The value of lifting_adaptive_prediction_threshold[ ] shall be in the range of 0 to <ADD>pow(2, max(attribute_bitdepth_minus1+1, attribute_secondary_bitdepth_minus1+1)−1.</ADD> When not present, the value of lifting_adaptive_prediction_threshold is inferred to be 0.

The variable AdaptivePredictionThreshold specifying the threshold to switch to adaptive predictor selection mode is set equal to lifting_adaptive_prediction_threshold.

Specifying the bound is beneficial for the simplification of conformance testing.

Example 5: On the Signaling of lifting_neighbour_bias_xyz[k]

In an example of G-PCC, the syntax and semantics of the syntax element lifting_neighbour_bias_xyz[k] are defined in the APS, as shown below.

| | |
|---|---|
| for( k = 0, k < 3, k++ ) | |
|     lifting_neighbour_bias_xyz[ k ] | ue(v) | lifting_neighbour_bias_xyz[k] specifies the factor used to weight the k-th component of the (x, y, z) point positions in the calculation of the Euclidean distance between two points as part of the nearest neighbour derivation process.

These values should be nonzero. Thus, this disclosure proposes that G-PCC encoder 200 be configured to signal the syntax element as lifting_neighbour_bias_minus1 xyz[k] instead. That is, the value of syntax element lifting_neighbour_bias_minus1 xyz[k] indicates the lifting neighbor bias minus 1. The corresponding syntax and semantics changes are shown below.

| | |
|---|---|
| for( k = 0, k < 3, k++ ) | |
|     lifting_neighbour_bias_<ADD>minus1</ADD>_xyz[ k ] | ue(v) | lifting_neighbour_bias_<ADD>minus1</ADD>_xyz[k] <ADD>plus 1</ADD> specifies the factor used to weigh the k-th component of the (x, y, z) point positions in the calculation of the Euclidean distance between two points as part of the nearest neighbour derivation process.

Accordingly, in one example of the disclosure, G-PCC encoder 200 and G-PCC decoder 300 may be configured to code (e.g., encode and decode, respectively) a lifting_neighbour_bias_xyz syntax element as lifting_neighbour_bias_xyz minus 1, wherein the lifting_neighbour_bias_xyz syntax element specifies a factor used to weight the k-th component of an (x, y, z) point position in a calculation of a Euclidean distance between two points as part of a nearest neighbour derivation process.

The following example techniques of the disclosure include the encoding and decoding of various syntax elements that define bounding boxes, slices, tiles, and other regions associated with encoding and decoding the positions and/or attributes of point cloud data. In some examples of G-PCC, such syntax elements are coded using an exponential Golomb code. In some instances, the values of such syntax elements may become very large when coded with an exponential Golomb code. In order to reduce the overall number of bits needed to code such syntax elements, this disclosure describes syntax element coding techniques that may reduce signaling overhead.

In one example of the disclosure, G-PCC encoder 200 and G-PCC decoder 300 may be configured to code (e.g., encode and decode, respectively) a first syntax element that indicates the number of bits used to code a second syntax element related to attribute coding. G-PCC encoder 200 and G-PCC decoder 300 may code the first syntax element using an exponential Golomb code. G-PCC encoder 200 and G-PCC decoder 300 may code the second syntax element using a fixed length code according to the number of bits. Examples of syntax elements that may be coded using a fixed length code according to a number of bits indicated by a first syntax element may include one or more of an offset of a bounding box, an origin point of the bounding box, a size of the bounding box, or a number of unique segments. By using the techniques of this disclosure, the number of bits needed to code the second syntax element may be substantially lower than only coding the second syntax element using an exponential Golomb code. In sone examples, the techniques of this disclosure may save up to 50 bits per syntax element.

Example 6: On the Signaling of SPS Bounding Box

The current syntax and semantics for a sequence parameter set (SPS) bounding

| | |
|---|---|
| sps_bounding_box_present_flag | u(1) |
| if( sps_bounding_box_present_flag ) { | |
|   for( k = 0; k < 3; k++ ) | |
|     sps_bounding_box_offset_xyz[ k ] | se(v) |
|   sps_bounding_box_offset_log2_scale | ue(v) |
|   for( k = 0, k < 3, k++ ) | |
|     sps_bounding_box_size_xyz[ k ] | ue(v) |
| } | |

The SPS bounding box offset and size define a region of a point cloud to which an SPS applies. The bounding box size cannot be equal to zero in each direction (i.e., x, y, z). Accordingly, in accordance with the techniques of this disclosure, G-PCC encoder 200 and G-PCC decoder 300 are configured to code sps_bounding_box_size_minus1_xyz[k], instead. That is, the value of syntax element sps_bounding_box_size_minus1_xyz[k] indicates the SPS bounding box size minus 1.

Additionally, the bounding box offset and box size both may be a large value. Accordingly, in accordance with the other example techniques of this disclosure, G-PCC encoder 200 and G-PCC decoder 300 are configured to code with a fixed length coding (s(v)/u(v)), indicating the number of bits signaled (similar to the signaling of tile bounding box). The number of bits (sps_bounding_box_bits_minus1+1) signaled could be coded with an exponential-Golomb code (e.g., ue(v)) or with a fixed length coding such as u(8).

| | |
|---|---|
| sps_bounding_box_present_flag | u(1) |
| if( sps_bounding_box_present_flag ) { | |
|     <ADD>sps_bounding_box_bits_minus1 | ue(v)</ADD> |
|     for( k = 0; k < 3; k++ ) | |
|         sps_bounding_box_offset_xyz[ k ] | <ADD>s(v)</ADD> |
|     sps_bounding_box_offset_log2_scale | ue(v) |
|     for( k = 0; k < 3; k++ ) | |
|         sps_bounding_box_size_<ADD>minus1</ADD>_xyz[ k ] | <ADD>u(v)</ADD> |
| } | |

Accordingly, in one example of the disclosure, G-PCC encoder 200 may determine the number of bits to use to encode an SPS bounding box offset syntax element (e.g., sps_bounding_box_offset_xzy[k]) and an SPS bounding box size syntax element (e.g., sps_bounding_box_size_minus1_xyz[k]). G-PCC encoder 200 may encode an SPS bounding box bits syntax element (e.g., sps_bounding_box_bits_minus1) that indicates the number of bits used to encode at least one of the SPS bounding box offset syntax element or the SPS bounding box size syntax element. G-PCC encoder 200 may further encode the SPS bounding box offset syntax element and/or the SPS bounding box size syntax element using a fixed length code (e.g., either a signed s(v) or unsigned u(v) fixed length code) and the determined number of bits.

Likewise, G-PCC decoder 300 may be configured to decode the SPS bounding box bits syntax element (e.g., sps_bounding_box_bits_minus1) that indicates the number of bits used to encode at least one of the SPS bounding box offset syntax element or the SPS bounding box size syntax element. G-PCC decoder 300 may then decode the SPS bounding box offset syntax element or the SPS bounding box size syntax element using a fixed length code (e.g., either a signed s(v) or unsigned u(v) fixed length code) based on the number of bits indicated by the SPS bounding box bits syntax element.

Example 7: On the Signaling of Region Delta QP Bounding Box

One example G-PCC syntax for a region delta QP bounding box is as follows:

| | |
|---|---|
| ash_attr_region_cnt | ue(v) |
| for( i = 0; i < ash_attr_region_cnt; i++ ) { | |
|     for( k = 0; k < 3; k++ ) | |
|         ash_attr_qp_region_origin_xyz[ i ][ k ] | ue(v) |
|     for( k = 0; k < 3; k++ ) | |
|         ash_attr_qp_region_size_minus1_xyz[ i ][ k ] | ue(v) |
|     for( k = 0; k < Min( 2, AttrDim ); k++) | |
|         ash_attr_region_qp_offset[ i ][ k ] | se(v) |
| } | |

The region delta QP bounding box defines a region of the point cloud to which a particular QP is applied. The QP for a region may be signaled as a delta (e.g., difference) between the region QP and a base QP.

In some examples, the bounding box size and bounding box origin both could be large values. Accordingly, in accordance with the example techniques of this disclosure, G-PCC decoder 300 is configured to decode the region delta QP bounding box origin (ash_attr_qp_region_origin_xyz[i][k]) and a region delta QP bounding box size (ash_attr_qp_region_size_minus1_xyz[i][k]) with fixed length coding using a signaled number of bits. G-PCC decoder 30 may decode a region delta QP bounding box bits (ash_attr_qp_region_bits_minus1) syntax element that indicates the number of bits to use for the fixed length coding. G-PCC decoder 300 may decode the region delta QP bounding box bits (ash_attr_qp_region_bits_minus1) syntax elements signaled using exponential-Golomb coding (e.g., ue(v)) or unsigned integer coding (e.g., u(n)), where n is a predetermined fixed number such as 4, 6 or 8 etc. The modified syntax is as follows:

| | |
|---|---|
| ash_attr_region_cnt | ue(v) |
| if(ash_attr_region_cnt) | |
|     <ADD>ash_attr_qp_region_bits_minus1</ADD> | <ADD>ue(v)</ADD> |
| for( i = 0; i < ash_attr_region_cnt; i++ ) { | |
|     for( k = 0; k < 3; k++ ) | |
|         ash_attr_qp_region_origin_xyz[ i ][ k ] | <ADD>u(v)</ADD> |
|     for( k = 0; k < 3; k++ ) | |
|         ash_attr_qp_region_size_minus1_xyz[ i ][ k ] | <ADD>u(v)</ADD> |
|     for( k = 0; k < Min( 2, AttrDim ); k++ ) | |
|         ash_attr_region_qp_offset[ i ][ k ] | se(v) |
| } | |

Accordingly, in one example of the disclosure, G-PCC encoder 200 may determine the number of bits to use to encode a region delta QP bounding box origin syntax element and a region delta QP bounding box origin size syntax element. G-PCC encoder 200 may encode a region delta QP bounding box bits syntax element that indicates the number of bits used to encode at least one of the region delta QP bounding box origin syntax element or the region delta QP bounding size origin syntax element. G-PCC encoder 200 may further encode the region delta QP bounding box origin syntax element and/or the region delta QP bounding box size syntax element using a fixed length code (e.g., either a signed s(v) or unsigned u(v) fixed length code) and the determined number of bits.

Likewise, G-PCC decoder 300 may be configured to decode the region delta QP bounding box bits syntax element that indicates the number of bits used to encode at least one of the region delta QP bounding box origin syntax element or the region delta QP bounding box size syntax element. G-PCC decoder 300 may then decode the region delta QP bounding box origin syntax element or the region delta QP bounding box size syntax element using a fixed length code (e.g., either a signed s(v) or unsigned u(v) fixed length code) based on the number of bits indicated by the region delta QP bounding box origin bits syntax element.

Example 8: On the Signaling of Tile Bounding Box and Tile Origin

The syntax and semantics of a tile bounding box and tile origin in an example of G-PCC are as follows.

| | |
|---|---|
| tile_cnt | u(16) |
| tile_bounding_box_bits | u(8) |
| for( tileIdx = 0; tileIdx < tile_cnt; tileIdx++ ) { | |
|   if( tile_id_present_flag ) | |
|     tile_id | ue(v) |
|   for( k = 0; k < 3; k++ ) | |
|     tile_bounding_box_offset_xyz[ tile_id ][ k ] | s(v) |
|   for( k = 0; k < 3; k++ ) | |
|     tile_bounding_box_size_xyz[ tile_id ][ k ] | u(v) |
| } | |
| for( k = 0; k < 3; k++ ) | |
|   tile_origin_xyz[ k ] | se(v) |
| tile_origin_1og2_scale | ue(v) |

The tile bounding box size and the tile bounding box origin define the location of a tile within point cloud data. In some examples, the tile bounding box size cannot have zero dimension. Accordingly, in accordance with the example techniques of this disclosure, G-PCC encoder 200 and G-PCC decoder 300 are configured to code tile_bounding_box_size_minus1_xyz[k] instead. That is, the value of syntax element tile_bounding_box_size_minus1_xyz[k] indicates the tile bounding box size minus 1.

Furthermore, the tile origin syntax element (tile_origin_xyz[k]) can be large values. Accordingly, in accordance with the example techniques of this disclosure, G-PCC encoder 200 and G-PCC decoder 300 are configured to code the tile origin syntax element (tile_origin_xyz[k]) using fixed length coding with a number of bits. The number of bits (tile_bounding_box_bits_minus1) used for the fixed length coding may be signaled before the tile origin syntax element (tile_origin_xyz[k]). Additionally, G-PCC encoder 200 and G-PCC decoder 300 are configured to code the tile_bounding_box_bits_minus1 instead of tile_bounding_box_bits, as the latter should be greater than 0.

| | |
|---|---|
| tile_cnt | u(16) |
| tile_bounding_box_bits<ADD>_minus1</ADD> | u(8) |
| for( tileIdx = 0; tileIdx < tile_cnt; tileIdx++ ) { | |
|   if( tile_id_present_flag ) | |
|     tile_id | ue(v) |
|   for( k = 0; k < 3; k++ ) | |
|     tile_bounding_box_offset_xyz[ tile_id ][ k ] | s(v) |
|   for( k = 0; k < 3; k++ ) | |
| | u(v) |
|   tile_bounding_box_size_<ADD>minus1_</ADD>xyz[ tile_id ][ k ] | |
| } | |
|   <ADD>tile_origin_bits_minus1 | ue(v) </ADD> |
| for( k = 0; k < 3; k++ ) | |
|   tile_origin_xyz[ k ] | <ADD>s(v) </ADD> |
| tile_origin_log2_scale | ue(v) |

Accordingly, in one example of the disclosure, G-PCC encoder 200 may determine the number of bits to use to encode a tile bounding box origin syntax element. G-PCC encoder 200 may encode a tile_bounding_box_bits syntax element that indicates the number of bits used to encode the tile bounding box origin syntax element. G-PCC encoder 200 may further encode the tile bounding box origin syntax element using a fixed length code (e.g., either a signed s(v) or unsigned u(v) fixed length code) and the determined number of bits.

Likewise, G-PCC decoder 300 may be configured to decode the tile bounding box bits syntax element that indicates the number of bits used to encode the tile bounding box origin syntax element. G-PCC decoder 300 may then decode the tile bounding box origin syntax element using a fixed length code (e.g., either a signed s(v) or unsigned u(v) fixed length code) based on the number of bits indicated by the tile bounding box bits syntax element.

Example 9: On the Signaling of (Geometry Slice Header (GSH) Box Origin

In an example of G-PCC, the syntax of the GSH box origin is as follows.

| | |
|---|---|
| if( gps_gsh_box_log2_scale_present_flag ) | |
|   gsh_box_log2_scale | ue(v) |
| for( k = 0; k < 3; k++ ) | |
|   gsh_box_origin_xyz[ k ] | ue(v) |

The GSH box origin defines the origin of a region of the point cloud to which a geometry slice header applies. The value of gsh_box_origin can be large. Accordingly, in accordance with the example techniques of this disclosure, G-PCC encoder 200 and G-PCC decoder 300 are configured to code gsh_box_origin with a fixed length code using a number of bits signaled prior (e.g., with ue(v)/u(n)). The modified syntax is shown below.

| | |
|---|---|
| if( gps_gsh_box_log2_scale_present_flag ) | |
|   gsh_box_log2_scale | ue(v) |
|   <ADD> gsh_box_origin_bits_minus1 | ue(v)</ADD> |
| for( k = 0; k < 3; k++ ) | |
|   gsh_box_origin_xyz[ k ] | <ADD>u(v) </ADD> |

Accordingly, in one example of the disclosure, G-PCC encoder 200 may determine the number of bits to use to encode a GSH box origin syntax element. G-PCC encoder 200 may encode a GSH box bits syntax element that indicates the number of bits used to encode the GSH box origin syntax element. G-PCC encoder 200 may further encode the GSH box origin syntax element using a fixed length code (e.g., either a signed s(v) or unsigned u(v) fixed length code) and the determined number of bits.

Likewise, G-PCC decoder 300 may be configured to decode the GSH box bits syntax element that indicates the number of bits used to encode the GSH box origin syntax element. G-PCC decoder 300 may then decode the GSH box origin syntax element using a fixed length code (e.g., either a signed s(v) or unsigned u(v) fixed length code) based on the number of bits indicated by the GSH box bits syntax element.

Example 10: On the Signaling of num_unique_segments_minus1

In an example of G-PCC, the syntax for num_unique_segments_minus1 in the geometry data unit header is as follows:

| | |
|---|---|
| if( log2_trisoup_node_size ) { | |
|   trisoup_sampling_value_minus1 | ue(v) |
|   num_unique_segments_minus1 | ue(v) |
| } | |

The values of the number of unique segments syntax element (num_unique_segments_minus1) can be fairly large. Accordingly, in accordance with the example techniques of this disclosure, G-PCC encoder 200 and G-PCC decoder 300 are configured to code num_unique_segments_minus1 with fixed length coding using a number of bits (e.g., the value of num_unique_segments_bits_minus_1+1) signaled prior (e.g., with ue(v)/u(n)). Modified syntax is shown below.

```
if( log2_trisoup_node_size ) {
    trisoup_sampling_value_minus1              ue(v)
    <ADD> num_unique_segments_bits_minus1      ue(v)</ADD>
    num_unique_segments_minus1                 <ADD>u(v)
                                               </ADD>
}
```

Accordingly, in one example of the disclosure, G-PCC encoder 200 may determine the number of bits to use to encode a number of unique segments syntax element (e.g., num_unique_segments_minus1). G-PCC encoder 200 may encode a number of unique segments bits syntax element (e.g., num_unique_segments_bits_minus1) that indicates the number of bits used to encode the number of unique segments syntax element. G-PCC encoder 200 may further encode the number of unique segments syntax element using a fixed length code (e.g., either a signed s(v) or unsigned u(v) fixed length code) and the determined number of bits.

Likewise, G-PCC decoder 300 may be configured to decode the number of unique segments bits syntax element that indicates the number of bits used to encode the number of unique segments syntax element. G-PCC decoder 300 may then decode the number of unique segments syntax element using a fixed length code (e.g., either a signed s(v) or unsigned u(v) fixed length code) based on the number of bits indicated by the number of unique segments bits syntax element.

Example 11: On Coding of geom_angular_origin

The syntax element geom_angular_origin_xyz[k] specifies the k-th component of the (x, y, z) co-ordinate of the origin used in the processing of the angular coding mode. When not present, geom_angular_origin_x, geom_angular_origin_y, and geom_angular_origin_z are inferred to be 0. In typical cases, the origin value may be quite large enough and Exponential-Golomb (se(v) coding may not be optimal. Accordingly, in accordance with the example techniques of this disclosure, G-PCC encoder 200 and G-PCC decoder 300 are configured to code geom_angular_origin_xyz[k] with fixed length coding (s(v) using a number of bits (e.g., the value of geom_angular_origin_bits_minus1+1) signaled prior (e.g., with ue(v)/u(n) coding). Modified syntax is shown below.

```
if( geometry_angular_enabled_flag ){
    if( geom_tree_type == 1 ) {
        geom_angular_azimuth_scale_log2        ue(v)
        geom_angular_azimuth_step              ue(v)
        geom_angular_radius_scale_log2         ue(v)
    }
    geom_angular_origin_bits_minus1            ue(v)
    for( k = 0; k < 3; k++ )
        geom_angular_origin_xyz[ k ]           s(v)
    number_lasers_minus1                       ue(v)
    laser_angle[ 0 ]                           se(v)
    laser_correction[ 0 ]                      se(v)
```

```
    if( geom_tree_type == 0 )
        laser_phi_per_turn[ 0 ]                ue(v)
    for( i = 1; i <= number_lasers_minus1; i++ ) {
        laser_angle_diff[ i ]                  se(v)
        laser_correction_diff[ i ]             se(v)
        if( geom_tree_type == 0 )
            laser_phi_per_turn_diff[ i ]       se(v)
    }
}
```

The syntax eleme3nt geom_angular_origin_bits_minus1 plus 1 specifies the number of bits used to represent the syntax element geom_angular_origin_xyz[k].

Accordingly, in one example of the disclosure, G-PCC encoder 200 may determine the number of bits to use to encode an angular coding mode origin syntax element (e.g., geom_angular_origin_xyz[k]). G-PCC encoder 200 may encode a number of angular coding mode origin bits syntax element (e.g., geom_angular_origin_bits_minus1) that indicates the number of bits used to encode the angular coding mode origin syntax element. G-PCC encoder 200 may further encode the angular coding mode origin syntax element using a fixed length code (e.g., either a signed s(v) or unsigned u(v) fixed length code) and the determined number of bits.

Likewise, G-PCC decoder 300 may be configured to decode the angular coding mode origin bits syntax element that indicates the number of bits used to encode the angular coding mode origin syntax element. G-PCC decoder 300 may then decode the angular coding mode origin syntax element using a fixed length code (e.g., either a signed s(v) or unsigned u(v) fixed length code) based on the number of bits indicated by the angular coding mode origin bits syntax element.

Figure 4:
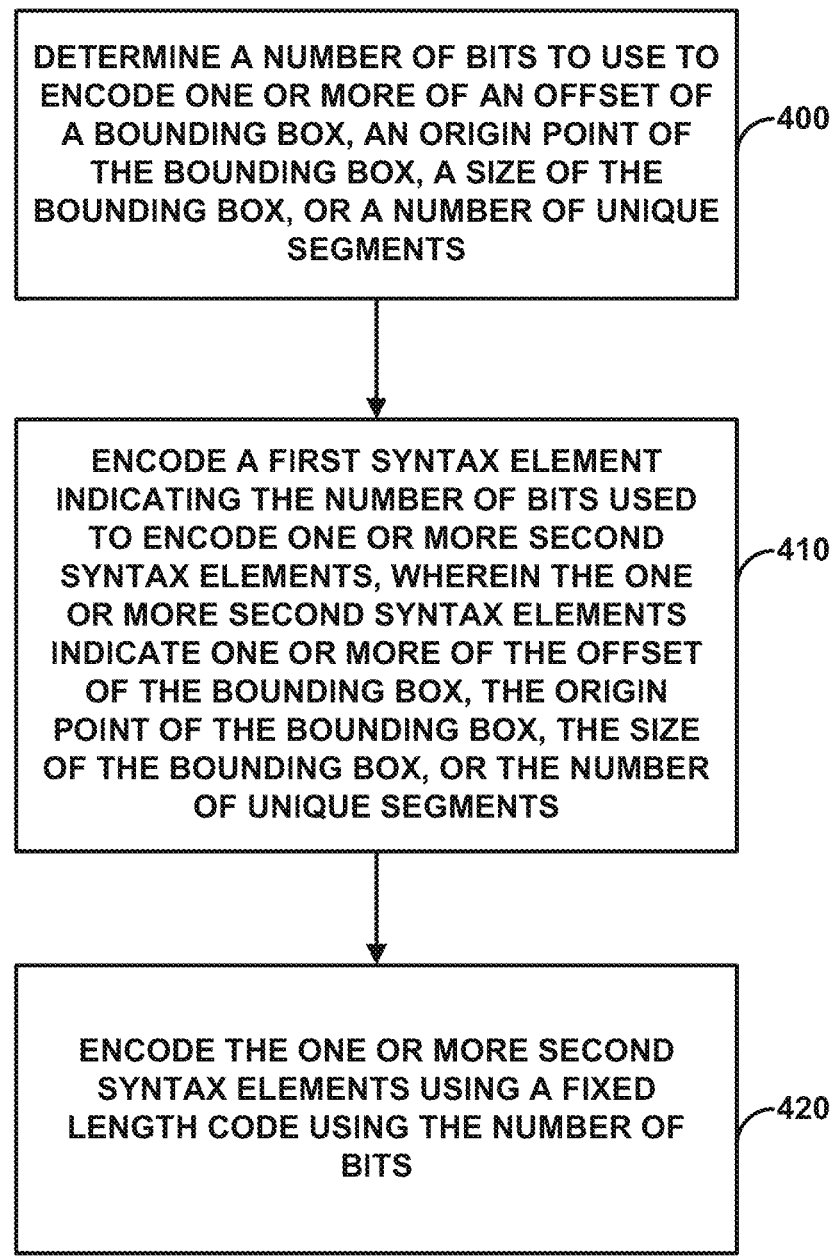
FIG. 4 is a flowchart illustrating an example encoding method according to the techniques of this disclosure.

FIG. 4 is a flowchart illustrating an example encoding method according to the techniques of this disclosure. The techniques of FIG. 4 may be performed by one or more structural components of G-PCC encoder 200.

In one example of the disclosure, G-PCC encoder 200 may be configured to determine a number of bits to use to encode one or more of an offset of a bounding box, an origin point of the bounding box, a size of the bounding box, or a number of unique segments (400). G-PCC encoder 200 may be further configured to encode a first syntax element indicating the number of bits used to encode one or more second syntax elements, wherein the one or more second syntax elements indicate one or more of the offset of the bounding box, the origin point of the bounding box, the size of the bounding box, or the number of unique segments (410), and encode the one or more second syntax elements using a fixed length code using the number of bits (420).

In one example of the disclosure, G-PCC encoder 200 may be configured to encode a sequence parameter set (SPS) bounding box bits syntax element that indicates the number of bits used to encode at least one of an SPS bounding box offset syntax element or an SPS bounding box size syntax element, and encode the SPS bounding box offset syntax element or the SPS bounding box size syntax element using the number of bits indicated by the SPS bounding box bits syntax element.

In another example of the disclosure, G-PCC encoder 200 may be configured to encode a region delta quantization parameter (QP) bounding box bits syntax element that indicates the number of bits used to encode a region delta QP bounding box origin syntax element and region delta QP bounding box size syntax element, and encode the region delta QP bounding box origin syntax element and the region delta QP bounding box size syntax element using the number of bits indicated by the region delta QP bounding box bits syntax element.

In another example of the disclosure, G-PCC encoder 200 may be configured to encode a tile bounding box bits syntax element that indicates the number of bits used to encode a tile bounding box origin syntax element, and encode the tile bounding box origin syntax element using the number of bits indicated by the tile bounding box bits syntax element.

In another example of the disclosure, G-PCC encoder 200 may be configured to encode a geometry slice header (GSH) box bits syntax element that indicates the number of bits used to encode a GSH box origin syntax element, and encode the GSH box origin syntax element using the number of bits indicated by the GSH box origin bits syntax element.

In another example of the disclosure, G-PCC encoder 200 may be configured to encode a number of unique segments bits syntax element that indicates the number of bits used to encode a number of unique segments syntax element, and encode the number of unique segments syntax element using the number of bits indicated by the number of unique segments bits syntax element.

In another example of the disclosure, G-PCC encoder 200 may be configured to encode the first syntax element using an exponential Golomb code.

In another example of the disclosure, G-PCC encoder 200 may be configured to encode a third syntax element indicating whether an inferred direct coding mode (IDCM) is enabled, and encode a fourth syntax element indicating a threshold for a planar mode based on IDCM being enabled.

In another example of the disclosure, G-PCC encoder 200 may be configured to encode a third syntax element indicating whether an inferred direct coding mode (IDCM) is enabled, and encode a fourth syntax element indicating a quantization parameter (QP) offset for the IDCM mode based on IDCM being enabled.

In another example of the disclosure, G-PCC encoder 200 may be configured to encode a lifting_neighbour_bias_xyz syntax element as lifting_neighbour_bias_xyz minus 1, wherein the lifting_neighbour_bias_xyz syntax element specifies a factor used to weight the k-th component of an (x, y, z) point position in a calculation of a Euclidean distance between two points as part of a nearest neighbour derivation process.

Figure 5:
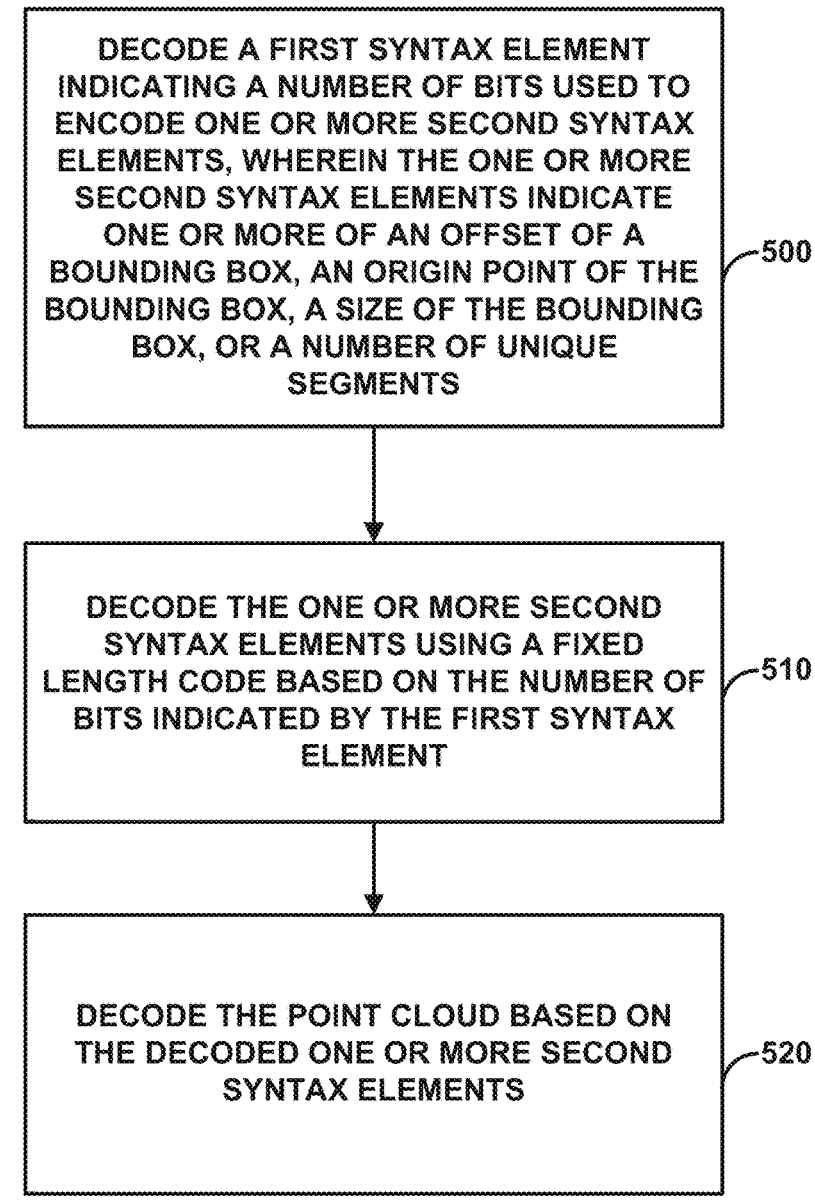
FIG. 5 is a flowchart illustrating an example encoding method according to the techniques of this disclosure.

FIG. 5 is a flowchart illustrating an example encoding method according to the techniques of this disclosure. The techniques of FIG. 5 may be performed by one or more structural components of G-PCC decoder 300.

In one example of the disclosure, G-PCC decoder 300 may be configured to decode a first syntax element indicating a number of bits used to encode one or more second syntax elements, wherein the one or more second syntax elements indicate one or more of an offset of a bounding box, an origin point of the bounding box, a size of the bounding box, or a number of unique segments (500). G-PCC decoder 300 may be further configured to decode the one or more second syntax elements using a fixed length code based on the number of bits indicated by the first syntax element (510), and decode the point cloud based on the decoded one or more second syntax elements (520).

In another example of the disclosure, G-PCC decoder 300 may be configured to decode a sequence parameter set (SPS) bounding box bits syntax element that indicates the number of bits used to encode at least one of an SPS bounding box offset syntax element or an SPS bounding box size syntax element, and decode the SPS bounding box offset syntax element or the SPS bounding box size syntax element based on the number of bits indicated by the SPS bounding box bits syntax element.

In another example of the disclosure, G-PCC decoder 300 may be configured to decode a region delta quantization parameter (QP) bounding box bits syntax element that indicates the number of bits used to encode a region delta QP bounding box origin syntax element and region delta QP bounding box size syntax element, and decode the region delta QP bounding box origin syntax element and the region delta QP bounding box size syntax element based on the number of bits indicated by the region delta QP bounding box bits syntax element.

In another example of the disclosure, G-PCC decoder 300 may be configured to decode a tile bounding box bits syntax element that indicates the number of bits used to encode a tile bounding box origin syntax element, and decode the tile bounding box origin syntax element based on the number of bits indicated by the tile bounding box bits syntax element.

In another example of the disclosure, G-PCC decoder 300 may be configured to decode a geometry slice header (GSH) box bits syntax element that indicates the number of bits used to encode a GSH box origin syntax element, and decode the GSH box origin syntax element based on the number of bits indicated by the GSH box origin bits syntax element.

In another example of the disclosure, G-PCC decoder 300 may be configured to decode a number of unique segments bits syntax element that indicates the number of bits used to encode a number of unique segments syntax element, and decode the number of unique segments syntax element based on the number of bits indicated by the number of unique segments bits syntax element.

In another example of the disclosure, G-PCC decoder 300 may be configured to decode the first syntax element using an exponential Golomb code.

In another example of the disclosure, G-PCC decoder 300 may be configured to decode a third syntax element indicating whether an inferred direct coding mode (IDCM) is enabled, and decode a fourth syntax element indicating a threshold for a planar mode based on the third syntax element indicating that IDCM is enabled.

In another example of the disclosure, G-PCC decoder 300 may be configured to decode a third syntax element indicating whether an inferred direct coding mode (IDCM) is enabled, and decode a fourth syntax element indicating a quantization parameter (QP) offset for the IDCM mode based on the third syntax element indicating that IDCM is enabled.

In another example of the disclosure, G-PCC decoder 300 may be configured to decode a lifting_neighbour_bias_xyz syntax element as lifting_neighbour_bias_xyz minus 1, wherein the lifting_neighbour_bias_xyz syntax element specifies a factor used to weight the k-th component of an (x, y, z) point position in a calculation of a Euclidean distance between two points as part of a nearest neighbour derivation process.

The following numbered clauses illustrate one or more aspects of the devices and techniques described in this disclosure.

Clause 1A—A method of coding a point cloud, the method comprising: coding a syntax element indicating if inferred direct coding mode (IDCM) is enabled; and coding a geomplanar_mode_th_idcm syntax element in the case that the syntax element indicates that IDCM is enabled.

Clause 2A—A method of coding a point cloud, the method comprising: coding a syntax element indicating if inferred direct coding mode (IDCM) is enabled; and coding a QP offset syntax element for IDCM nodes in the case that the syntax element indicates that IDCM is enabled.

Clause 3A—A method of coding a point cloud, the method comprising: coding a level-of-detail (LoD) scale and an LoD offset according to a bitstream conformance requirement where the LoD scale and the LoD offset cannot have a value of 0 for a particular LoD.

Clause 4A—A method of coding a point cloud, the method comprising: coding a lifting_adaptive_prediction_threshold in accordance with an upper bound.

Clause 5A—A method of coding a point cloud, the method comprising: coding a lifting_neighbour_bias_xyz syntax element as lifting_neighbour_bias_xyz minus 1.

Clause 6A—A method of coding a point cloud, the method comprising: coding an SPS bounding box syntax element as the SPS bounding box syntax element minus 1.

Clause 7A—A method of coding a point cloud, the method comprising: coding a region delta QP bounding box syntax element as the region delta QP bounding box syntax element minus 1.

Clause 8A—A method of coding a point cloud, the method comprising: coding a tile bounding box syntax element as the tile bounding box syntax element minus 1.

Clause 9A—A method of coding a point cloud, the method comprising: coding a GSH box origin syntax element as the GSH box origin syntax element minus 1.

Clause 10A—A method of coding a point cloud, the method comprising: coding a number of unique segments bits syntax element as the number of unique segments bits syntax element minus 1.

Clause 11A—A method of any combination of Clauses 1A-10A.

Clause 12A—The method of any of Clauses 1A-11A, further comprising generating the point cloud.

Clause 13A—A device for processing a point cloud, the device comprising one or more means for performing the method of any of Clauses 1A-12A.

Clause 14A—The device of Clause 13A, wherein the one or more means comprise one or more processors implemented in circuitry.

Clause 15A—The device of any of Clauses 13A or 14A, further comprising a memory to store the data representing the point cloud.

Clause 16A—The device of any of Clauses 13A-15A, wherein the device comprises a decoder.

Clause 17A—The device of any of Clauses 13A-16A, wherein the device comprises an encoder.

Clause 18A—The device of any of Clauses 13A-17A, further comprising a device to generate the point cloud.

Clause 19A—The device of any of Clauses 13A-18A, further comprising a display to present imagery based on the point cloud.

Clause 20A—A computer-readable storage medium having stored thereon instructions that, when executed, cause one or more processors to perform the method of any of Clauses 1A-12A.

Clause 1B—A method of decoding a point cloud, the method comprising: decoding a first syntax element indicating a number of bits used to encode one or more second syntax elements, wherein the one or more second syntax elements indicate one or more of an offset of a bounding box, an origin point of the bounding box, a size of the bounding box, or a number of unique segments; decoding the one or more second syntax elements using a fixed length code based on the number of bits indicated by the first syntax element; and decoding the point cloud based on the decoded one or more second syntax elements.

Clause 2B—The method of Clause 1B, wherein decoding the first syntax element comprises decoding a sequence parameter set (SPS) bounding box bits syntax element that indicates the number of bits used to encode at least one of an SPS bounding box offset syntax element or an SPS bounding box size syntax element, and wherein decoding the one or more second syntax elements comprises decoding the SPS bounding box offset syntax element or the SPS bounding box size syntax element based on the number of bits indicated by the SPS bounding box bits syntax element.

Clause 3B—The method of any of Clauses 1B-2B, wherein decoding the first syntax element comprises decoding a region delta quantization parameter (QP) bounding box bits syntax element that indicates the number of bits used to encode a region delta QP bounding box origin syntax element and region delta QP bounding box size syntax element, and wherein decoding the one or more second syntax elements comprises decoding the region delta QP bounding box origin syntax element and the region delta QP bounding box size syntax element based on the number of bits indicated by the region delta QP bounding box bits syntax element.

Clause 4B—The method of any of Clauses 1B-3B, wherein decoding the first syntax element comprises decoding a tile bounding box bits syntax element that indicates the number of bits used to encode a tile bounding box origin syntax element, and wherein decoding the one or more second syntax elements comprises decoding the tile bounding box origin syntax element based on the number of bits indicated by the tile bounding box bits syntax element.

Clause 5B—The method of any of Clauses 1B-4B, wherein decoding the first syntax element comprises decoding a geometry slice header (GSH) box bits syntax element that indicates the number of bits used to encode a GSH box origin syntax element, and wherein decoding the one or more second syntax elements comprises decoding the GSH box origin syntax element based on the number of bits indicated by the GSH box origin bits syntax element.

Clause 6B—The method of any of Clauses 1B-5B, wherein decoding the first syntax element comprises decoding a number of unique segments bits syntax element that indicates the number of bits used to encode a number of unique segments syntax element, and wherein decoding the one or more second syntax elements comprises decoding the number of unique segments syntax element based on the number of bits indicated by the number of unique segments bits syntax element.

Clause 7B—The method any of Clauses 1B-6B, wherein decoding the first syntax element comprises decoding an angular coding mode origin bits syntax element that indicates the number of bits used to encode an angular coding mode origin syntax element, and wherein decoding the one or more second syntax elements comprises decoding the angular coding mode origin syntax element based on the number of bits indicated by the angular coding mode origin bits syntax element.

Clause 8B—The method of any of Clauses 1B-7B, wherein decoding the first syntax element comprises: decoding the first syntax element using an exponential Golomb code.

Clause 9B—The method of any of Clauses 1B-8B, further comprising: decoding a third syntax element indicating whether an inferred direct coding mode (IDCM) is enabled;

and decoding a fourth syntax element indicating a threshold for a planar mode based on the third syntax element indicating that IDCM is enabled.

Clause 10B—The method of any of Clauses 1B-9B, further comprising: decoding a third syntax element indicating whether an inferred direct coding mode (IDCM) is enabled; and decoding a fourth syntax element indicating a quantization parameter (QP) offset for the IDCM mode based on the third syntax element indicating that IDCM is enabled.

Clause 11B—The method of any of Clauses 1B-10B, further comprising: decoding a lifting_neighbour_bias_xyz syntax element as lifting_neighbour_bias_xyz minus 1, wherein the lifting_neighbour_bias_xyz syntax element specifies a factor used to weight the k-th component of an (x, y, z) point position in a calculation of a Euclidean distance between two points as part of a nearest neighbour derivation process.

Clause 12B—An apparatus configured to decode a point cloud, the apparatus comprising: a memory; and one or more processors implemented in circuitry and in communication with the memory, the one or more processors configured to: decode a first syntax element indicating a number of bits used to encode one or more second syntax elements, wherein the one or more second syntax elements indicate one or more of an offset of a bounding box, an origin point of the bounding box, a size of the bounding box, or a number of unique segments; decode the one or more second syntax elements using a fixed length code based on the number of bits indicated by the first syntax element; and decode the point cloud based on the decoded one or more second syntax elements.

Clause 13B—The apparatus of Clause 12B, wherein to decode the first syntax element, the one or more processors are further configured to decode a sequence parameter set (SPS) bounding box bits syntax element that indicates the number of bits used to encode at least one of an SPS bounding box offset syntax element or an SPS bounding box size syntax element, and wherein to decode the one or more second syntax elements, the one or more processors are further configured to decode the SPS bounding box offset syntax element or the SPS bounding box size syntax element based on the number of bits indicated by the SPS bounding box bits syntax element.

Clause 14B—The apparatus of any of Clauses 12B-13B, wherein to decode the first syntax element, the one or more processors are further configured to decode a region delta quantization parameter (QP) bounding box bits syntax element that indicates the number of bits used to encode a region delta QP bounding box origin syntax element and region delta QP bounding box size syntax element, and wherein to decode the one or more second syntax elements, the one or more processors are further configured to decode the region delta QP bounding box origin syntax element and the region delta QP bounding box size syntax element based on the number of bits indicated by the region delta QP bounding box bits syntax element.

Clause 15B—The apparatus of any of Clauses 12B-14B, wherein to decode the first syntax element, the one or more processors are further configured to decode a tile bounding box bits syntax element that indicates the number of bits used to encode a tile bounding box origin syntax element, and wherein to decode the one or more second syntax elements, the one or more processors are further configured to decode the tile bounding box origin syntax element based on the number of bits indicated by the tile bounding box bits syntax element.

Clause 16B—The apparatus of any of Clauses 12B-15B, wherein to decode the first syntax element, the one or more processors are further configured to decode a geometry slice header (GSH) box bits syntax element that indicates the number of bits used to encode a GSH box origin syntax element, and wherein to decode the one or more second syntax elements, the one or more processors are further configured to decode the GSH box origin syntax element based on the number of bits indicated by the GSH box origin bits syntax element.

Clause 17B—The apparatus of any of Clauses 12B-16B, wherein to decode the first syntax element, the one or more processors are further configured to decode a number of unique segments bits syntax element that indicates the number of bits used to encode a number of unique segments syntax element, and wherein to decode the one or more second syntax elements, the one or more processors are further configured to decode the number of unique segments syntax element based on the number of bits indicated by the number of unique segments bits syntax element.

Clause 18B—The apparatus of any of Clauses 12B-17B, wherein to decode the first syntax element, the one or more processors are further configured to decode an angular coding mode origin bits syntax element that indicates the number of bits used to encode an angular coding mode origin syntax element, and wherein to decode the one or more second syntax elements, the one or more processors are further configured to decode the angular coding mode origin syntax element based on the number of bits indicated by the angular coding mode origin bits syntax element.

Clause 19B—The apparatus of any of Clauses 12B-18B, wherein to decode the first syntax element, the one or more processors are further configured to: decode the first syntax element using an exponential Golomb code.

Clause 20B—The apparatus of any of Clauses 12B-19B, wherein the one or more processors are further configured to: decode a third syntax element indicating whether an inferred direct coding mode (IDCM) is enabled; and decode a fourth syntax element indicating a threshold for a planar mode based on the third syntax element indicating that IDCM is enabled.

Clause 21B—The apparatus of any of Clauses 12B-20B, wherein the one or more processors are further configured to: decode a third syntax element indicating whether an inferred direct coding mode (IDCM) is enabled; and decode a fourth syntax element indicating a quantization parameter (QP) offset for the IDCM mode based on the third syntax element indicating that IDCM is enabled.

Clause 22B—The apparatus of any of Clauses 12B-21B, wherein the one or more processors are further configured to: decode a lifting_neighbour_bias_xyz syntax element as lifting_neighbour_bias_xyz minus 1, wherein the lifting_neighbour_bias_xyz syntax element specifies a factor used to weight the k-th component of an (x, y, z) point position in a calculation of a Euclidean distance between two points as part of a nearest neighbour derivation process.

Clause 23B—A method of encoding a point cloud, the method comprising: encoding a first syntax element indicating a number of bits used to encode one or more second syntax elements, wherein the one or more second syntax elements indicate one or more of an offset of a bounding box, an origin point of the bounding box, a size of the bounding box, or a number of unique segments; and encoding the one or more second syntax elements using a fixed length code and the number of bits.

Clause 24B—The method of Clause 23B, wherein encoding the first syntax element comprises encoding a sequence parameter set (SPS) bounding box bits syntax element that indicates the number of bits used to encode at least one of an SPS bounding box offset syntax element or an SPS bounding box size syntax element, and wherein encoding the one or more second syntax elements comprises encoding the SPS bounding box offset syntax element or the SPS bounding box size syntax element using the number of bits indicated by the SPS bounding box bits syntax element.

Clause 25B—The method of any of Clauses 23B-24B, wherein encoding the first syntax element comprises encoding a region delta quantization parameter (QP) bounding box bits syntax element that indicates the number of bits used to encode a region delta QP bounding box origin syntax element and region delta QP bounding box size syntax element, and wherein encoding the one or more second syntax elements comprises encoding the region delta QP bounding box origin syntax element and the region delta QP bounding box size syntax element using the number of bits indicated by the region delta QP bounding box bits syntax element.

Clause 26B—The method of any of Clauses 23B-25B, wherein encoding the first syntax element comprises encoding a tile bounding box bits syntax element that indicates the number of bits used to encode a tile bounding box origin syntax element, and wherein encoding the one or more second syntax elements comprises encoding the tile bounding box origin syntax element using the number of bits indicated by the tile bounding box bits syntax element.

Clause 27B—The method of any of Clauses 23B-26B, wherein encoding the first syntax element comprises encoding a geometry slice header (GSH) box bits syntax element that indicates the number of bits used to encode a GSH box origin syntax element, and wherein encoding the one or more second syntax elements comprises encoding the GSH box origin syntax element using the number of bits indicated by the GSH box origin bits syntax element.

Clause 28B—The method of any of Clauses 23B-27B, wherein encoding the first syntax element comprises encoding a number of unique segments bits syntax element that indicates the number of bits used to encode a number of unique segments syntax element, and wherein encoding the one or more second syntax elements comprises encoding the number of unique segments syntax element using the number of bits indicated by the number of unique segments bits syntax element.

Clause 29B—The method of any of Clauses 23B-28B, wherein encoding the first syntax element comprises encoding an angular coding mode origin bits syntax element that indicates the number of bits used to encode an angular coding mode origin syntax element, and wherein encoding the one or more second syntax elements comprises encoding the angular coding mode origin syntax element based on the number of bits indicated by the angular coding mode origin bits syntax element.

Clause 30B—The method of any of Clauses 23B-29B, wherein encoding the first syntax element comprises: encoding the first syntax element using an exponential Golomb code.

Clause 31B—The method of any of Clauses 23B-30B, further comprising: encoding a third syntax element indicating whether an inferred direct coding mode (IDCM) is enabled; and encoding a fourth syntax element indicating a threshold for a planar mode based on IDCM being enabled.

Clause 32B—The method of any of Clauses 23B-31B, further comprising: encoding a third syntax element indicating whether an inferred direct coding mode (IDCM) is enabled; and encoding a fourth syntax element indicating a quantization parameter (QP) offset for the IDCM mode based on IDCM being enabled.

Clause 33B—The method of any of Clauses 23B-32B, further comprising: encoding a lifting_neighbour_bias_xyz syntax element as lifting_neighbour_bias_xyz minus 1, wherein the lifting_neighbour_bias_xyz syntax element specifies a factor used to weight the k-th component of an (x, y, z) point position in a calculation of a Euclidean distance between two points as part of a nearest neighbour derivation process.

Clause 34B—An apparatus configured to encode a point cloud, the apparatus comprising: a memory; and one or more processors implemented in circuitry and in communication with the memory, the one or more processors configured to: encode a first syntax element indicating a number of bits used to encode one or more second syntax elements, wherein the one or more second syntax elements indicate one or more of an offset of a bounding box, an origin point of the bounding box, a size of the bounding box, or a number of unique segments; and encode the one or more second syntax elements using a fixed length code using the number of bits.

Clause 35B—The apparatus of Clause 34B, wherein to encode the first syntax element, the one or more processors are further configured to encode a sequence parameter set (SPS) bounding box bits syntax element that indicates the number of bits used to encode at least one of an SPS bounding box offset syntax element or an SPS bounding box size syntax element, and wherein to encode the one or more second syntax elements, the one or more processors are further configured to encode the SPS bounding box offset syntax element or the SPS bounding box size syntax element using the number of bits indicated by the SPS bounding box bits syntax element.

Clause 36B—The apparatus of any of Clauses 34B-35B, wherein to encode the first syntax element, the one or more processors are further configured to encode a region delta quantization parameter (QP) bounding box bits syntax element that indicates the number of bits used to encode a region delta QP bounding box origin syntax element and region delta QP bounding box size syntax element, and wherein to encode the one or more second syntax elements, the one or more processors are further configured to encode the region delta QP bounding box origin syntax element and the region delta QP bounding box size syntax element using the number of bits indicated by the region delta QP bounding box bits syntax element.

Clause 37B—The apparatus of any of Clauses 34B-36B, wherein to encode the first syntax element, the one or more processors are further configured to encode a tile bounding box bits syntax element that indicates the number of bits used to encode a tile bounding box origin syntax element, and wherein to encode the one or more second syntax elements, the one or more processors are further configured to encode the tile bounding box origin syntax element using the number of bits indicated by the tile bounding box bits syntax element.

Clause 38B—The apparatus of any of Clauses 34B-37B, wherein to encode the first syntax element, the one or more processors are further configured to encode a geometry slice header (GSH) box bits syntax element that indicates the number of bits used to encode a GSH box origin syntax element, and wherein to encode the one or more second syntax elements, the one or more processors are further configured to encode the GSH box origin syntax element using the number of bits indicated by the GSH box origin bits syntax element.

Clause 39B—The apparatus of any of Clauses 34B-38B, wherein to encode the first syntax element, the one or more processors are further configured to encode a number of unique segments bits syntax element that indicates the number of bits used to encode a number of unique segments syntax element, and wherein to encode the one or more second syntax elements, the one or more processors are further configured to encode the number of unique segments syntax element using the number of bits indicated by the number of unique segments bits syntax element.

Clause 40B—The apparatus of any of Clauses 34B-39B, wherein to encode the first syntax element, the one or more processors are further configured to encode an angular coding mode origin bits syntax element that indicates the number of bits used to encode an angular coding mode origin syntax element, and wherein to encode the one or more second syntax elements, the one or more processors are further configured to encode the angular coding mode origin syntax element based on the number of bits indicated by the angular coding mode origin bits syntax element.

Clause 41B—The apparatus of any of Clauses 34B-40B, wherein to encode the first syntax element, the one or more processors are further configured to: encode the first syntax element using an exponential Golomb code.

Clause 42B—The apparatus of any of Clauses 34B-41B, wherein the one or more processors are further configured to: encode a third syntax element indicating whether an inferred direct coding mode (IDCM) is enabled; and encode a fourth syntax element indicating a threshold for a planar mode based on IDCM being enabled.

Clause 43B—The apparatus of any of Clauses 34B-42B, wherein the one or more processors are further configured to: encode a third syntax element indicating whether an inferred direct coding mode (IDCM) is enabled; and encode a fourth syntax element indicating a quantization parameter (QP) offset for the IDCM mode based on IDCM being enabled.

Clause 44B—The apparatus of any of Clauses 34B-43B, wherein the one or more processors are further configured to: encode a lifting_neighbour_bias_xyz syntax element as lifting_neighbour_bias_xyz minus 1, wherein the lifting_neighbour_bias_xyz syntax element specifies a factor used to weight the k-th component of an (x, y, z) point position in a calculation of a Euclidean distance between two points as part of a nearest neighbour derivation process.

Clause 45B—An apparatus configured to decode point cloud data, the apparatus comprising: means for decoding a first syntax element indicating a number of bits used to encode one or more second syntax elements, wherein the one or more second syntax elements indicate one or more of an offset of a bounding box, an origin point of the bounding box, a size of the bounding box, or a number of unique segments; means for decoding the one or more second syntax elements using a fixed length code based on the number of bits indicated by the first syntax element; and means for decoding the point cloud based on the decoded one or more second syntax elements.

Clause 46B—A non-transitory computer-readable storage medium storing instructions that, when executed, cause one or more processors configured to decode point cloud data to: decode a first syntax element indicating a number of bits used to encode one or more second syntax elements, wherein the one or more second syntax elements indicate one or more of an offset of a bounding box, an origin point of the bounding box, a size of the bounding box, or a number of unique segments; decode the one or more second syntax elements using a fixed length code based on the number of bits indicated by the first syntax element; and decode the point cloud based on the decoded one or more second syntax elements.

Clause 47B—An apparatus configured to encode point cloud data, the apparatus comprising: means for encoding a first syntax element indicating a number of bits used to encode one or more second syntax elements, wherein the one or more second syntax elements indicate one or more of an offset of a bounding box, an origin point of the bounding box, a size of the bounding box, or a number of unique segments; and means for encoding the one or more second syntax elements using a fixed length code and the number of bits.

Clause 48B—A non-transitory computer-readable storage medium storing instructions that, when executed, cause one or more processors configured to encode point cloud data to: encode a first syntax element indicating a number of bits used to encode one or more second syntax elements, wherein the one or more second syntax elements indicate one or more of an offset of a bounding box, an origin point of the bounding box, a size of the bounding box, or a number of unique segments; and encode the one or more second syntax elements using a fixed length code using the number of bits.

Examples in the various aspects of this disclosure may be used individually or in any combination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding a point cloud, the method comprising:
    decoding, from a bitstream, a first syntax element indicating a number of bits used to encode one or more second syntax elements, wherein the one or more second syntax elements indicate one or more of an offset of a bounding box, an origin point of the bounding box, a size of the bounding box, or a number of unique segments, and wherein the first syntax element is separate from the one or more second syntax elements;
    decoding, from the bitstream, the one or more second syntax elements using a fixed length code based on the number of bits indicated by the first syntax element; and
    decoding the point cloud based on values of the one or more second syntax elements.

2. The method of claim 1, wherein decoding the first syntax element comprises decoding a sequence parameter set (SPS) bounding box bits syntax element that indicates the number of bits used to encode at least one of an SPS bounding box offset syntax element or an SPS bounding box size syntax element, and
    wherein decoding the one or more second syntax elements comprises decoding the SPS bounding box offset syntax element or the SPS bounding box size syntax element based on the number of bits indicated by the SPS bounding box bits syntax element.

3. The method of claim 1, wherein decoding the first syntax element comprises decoding a region delta quantization parameter (QP) bounding box bits syntax element that indicates the number of bits used to encode a region delta QP bounding box origin syntax element and region delta QP bounding box size syntax element, and
    wherein decoding the one or more second syntax elements comprises decoding the region delta QP bounding box origin syntax element and the region delta QP bounding box size syntax element based on the number of bits indicated by the region delta QP bounding box bits syntax element.

4. The method of claim 1, wherein decoding the first syntax element comprises decoding a tile bounding box bits syntax element that indicates the number of bits used to encode a tile bounding box origin syntax element, and
    wherein decoding the one or more second syntax elements comprises decoding the tile bounding box origin syntax element based on the number of bits indicated by the tile bounding box bits syntax element.

5. The method of claim 1, wherein decoding the first syntax element comprises decoding a geometry slice header (GSH) box bits syntax element that indicates the number of bits used to encode a GSH box origin syntax element, and
    wherein decoding the one or more second syntax elements comprises decoding the GSH box origin syntax element based on the number of bits indicated by the GSH box origin bits syntax element.

6. The method of claim 1, wherein decoding the first syntax element comprises decoding a number of unique segments bits syntax element that indicates the number of bits used to encode a number of unique segments syntax element, and
    wherein decoding the one or more second syntax elements comprises decoding the number of unique segments syntax element based on the number of bits indicated by the number of unique segments bits syntax element.

7. The method of claim 1, wherein decoding the first syntax element comprises decoding an angular coding mode origin bits syntax element that indicates the number of bits used to encode an angular coding mode origin syntax element, and
    wherein decoding the one or more second syntax elements comprises decoding the angular coding mode origin syntax element based on the number of bits indicated by the angular coding mode origin bits syntax element.

8. The method of claim 1, wherein decoding the first syntax element comprises:
    decoding the first syntax element using an exponential Golomb code.

9. The method of claim 1, further comprising:
    decoding a third syntax element indicating whether an inferred direct coding mode (IDCM) is enabled; and
    decoding a fourth syntax element indicating a threshold for a planar mode based on the third syntax element indicating that IDCM is enabled.

10. The method of claim 1, further comprising:
    decoding a third syntax element indicating whether an inferred direct coding mode (IDCM) is enabled; and
    decoding a fourth syntax element indicating a quantization parameter (QP) offset for the IDCM based on the third syntax element indicating that IDCM is enabled.

11. The method of claim 1, further comprising:
    decoding a lifting_neighbour_bias_xyz syntax element as lifting_neighbour_bias_xyz minus 1, wherein the lifting_neighbour_bias_xyz syntax element specifies a factor used to weight a k-th component of an (x, y, z) point position in a calculation of a Euclidean distance between two points as part of a nearest neighbour derivation process.

12. An apparatus configured to decode a point cloud, the apparatus comprising:
a memory; and
one or more processors implemented in circuitry and in communication with the memory, the one or more processors configured to:
decode, from a bitstream, a first syntax element indicating a number of bits used to encode one or more second syntax elements, wherein the one or more second syntax elements indicate one or more of an offset of a bounding box, an origin point of the bounding box, a size of the bounding box, or a number of unique segments, and wherein the first syntax element is separate from the one or more second syntax elements;
decode, from the bitstream, the one or more second syntax elements using a fixed length code based on the number of bits indicated by the first syntax element; and
decode the point cloud based on values of the one or more second syntax elements.

13. The apparatus of claim 12, wherein to decode the first syntax element, the one or more processors are further configured to decode a sequence parameter set (SPS) bounding box bits syntax element that indicates the number of bits used to encode at least one of an SPS bounding box offset syntax element or an SPS bounding box size syntax element, and
wherein to decode the one or more second syntax elements, the one or more processors are further configured to decode the SPS bounding box offset syntax element or the SPS bounding box size syntax element based on the number of bits indicated by the SPS bounding box bits syntax element.

14. The apparatus of claim 12, wherein to decode the first syntax element, the one or more processors are further configured to decode a region delta quantization parameter (QP) bounding box bits syntax element that indicates the number of bits used to encode a region delta QP bounding box origin syntax element and region delta QP bounding box size syntax element, and
wherein to decode the one or more second syntax elements, the one or more processors are further configured to decode the region delta QP bounding box origin syntax element and the region delta QP bounding box size syntax element based on the number of bits indicated by the region delta QP bounding box bits syntax element.

15. The apparatus of claim 12, wherein to decode the first syntax element, the one or more processors are further configured to decode a tile bounding box bits syntax element that indicates the number of bits used to encode a tile bounding box origin syntax element, and
wherein to decode the one or more second syntax elements, the one or more processors are further configured to decode the tile bounding box origin syntax element based on the number of bits indicated by the tile bounding box bits syntax element.

16. The apparatus of claim 12, wherein to decode the first syntax element, the one or more processors are further configured to decode a geometry slice header (GSH) box bits syntax element that indicates the number of bits used to encode a GSH box origin syntax element, and
wherein to decode the one or more second syntax elements, the one or more processors are further configured to decode the GSH box origin syntax element based on the number of bits indicated by the GSH box origin bits syntax element.

17. The apparatus of claim 12, wherein to decode the first syntax element, the one or more processors are further configured to decode a number of unique segments bits syntax element that indicates the number of bits used to encode a number of unique segments syntax element, and
wherein to decode the one or more second syntax elements, the one or more processors are further configured to decode the number of unique segments syntax element based on the number of bits indicated by the number of unique segments bits syntax element.

18. The apparatus of claim 12, wherein to decode the first syntax element, the one or more processors are further configured to decode an angular coding mode origin bits syntax element that indicates the number of bits used to encode an angular coding mode origin syntax element, and
wherein to decode the one or more second syntax elements, the one or more processors are further configured to decode the angular coding mode origin syntax element based on the number of bits indicated by the angular coding mode origin bits syntax element.

19. The apparatus of claim 12, wherein to decode the first syntax element, the one or more processors are further configured to:
decode the first syntax element using an exponential Golomb code.

20. The apparatus of claim 12, wherein the one or more processors are further configured to:
decode a third syntax element indicating whether an inferred direct coding mode (IDCM) is enabled; and
decode a fourth syntax element indicating a threshold for a planar mode based on the third syntax element indicating that IDCM is enabled.

21. The apparatus of claim 12, wherein the one or more processors are further configured to:
decode a third syntax element indicating whether an inferred direct coding mode (IDCM) is enabled; and
decode a fourth syntax element indicating a quantization parameter (QP) offset for the IDCM based on the third syntax element indicating that IDCM is enabled.

22. The apparatus of claim 12, wherein the one or more processors are further configured to:
decode a lifting_neighbour_bias_xyz syntax element as lifting_neighbour_bias_xyz minus 1, wherein the lifting_neighbour_bias_xyz syntax element specifies a factor used to weight a k-th component of an (x, y, z) point position in a calculation of a Euclidean distance between two points as part of a nearest neighbour derivation process.

23. A method of encoding a point cloud, the method comprising:
encoding a first syntax element indicating a number of bits used to encode one or more second syntax elements, wherein the one or more second syntax elements indicate one or more of an offset of a bounding box, an origin point of the bounding box, a size of the bounding box, or a number of unique segments, and wherein the first syntax element is separate from the one or more second syntax elements; and
encoding the one or more second syntax elements using a fixed length code and the number of bits.

24. The method of claim 23, wherein encoding the first syntax element comprises encoding a sequence parameter set (SPS) bounding box bits syntax element that indicates the number of bits used to encode at least one of an SPS bounding box offset syntax element or an SPS bounding box size syntax element, and
   wherein encoding the one or more second syntax elements comprises encoding the SPS bounding box offset syntax element or the SPS bounding box size syntax element using the number of bits indicated by the SPS bounding box bits syntax element.

25. The method of claim 23, wherein encoding the first syntax element comprises encoding a region delta quantization parameter (QP) bounding box bits syntax element that indicates the number of bits used to encode a region delta QP bounding box origin syntax element and region delta QP bounding box size syntax element, and
   wherein encoding the one or more second syntax elements comprises encoding the region delta QP bounding box origin syntax element and the region delta QP bounding box size syntax element using the number of bits indicated by the region delta QP bounding box bits syntax element.

26. The method of claim 23, wherein encoding the first syntax element comprises encoding a tile bounding box bits syntax element that indicates the number of bits used to encode a tile bounding box origin syntax element, and
   wherein encoding the one or more second syntax elements comprises encoding the tile bounding box origin syntax element using the number of bits indicated by the tile bounding box bits syntax element.

27. The method of claim 23, wherein encoding the first syntax element comprises encoding a geometry slice header (GSH) box bits syntax element that indicates the number of bits used to encode a GSH box origin syntax element, and
   wherein encoding the one or more second syntax elements comprises encoding the GSH box origin syntax element using the number of bits indicated by the GSH box origin bits syntax element.

28. The method of claim 23, wherein encoding the first syntax element comprises encoding a number of unique segments bits syntax element that indicates the number of bits used to encode a number of unique segments syntax element, and
   wherein encoding the one or more second syntax elements comprises encoding the number of unique segments syntax element using the number of bits indicated by the number of unique segments bits syntax element.

29. The method of claim 23, wherein encoding the first syntax element comprises encoding an angular coding mode origin bits syntax element that indicates the number of bits used to encode an angular coding mode origin syntax element, and
   wherein encoding the one or more second syntax elements comprises encoding the angular coding mode origin syntax element based on the number of bits indicated by the angular coding mode origin bits syntax element.

30. The method of claim 23, wherein encoding the first syntax element comprises:
   encoding the first syntax element using an exponential Golomb code.

31. The method of claim 23, further comprising:
   encoding a third syntax element indicating whether an inferred direct coding mode (IDCM) is enabled; and
   encoding a fourth syntax element indicating a threshold for a planar mode based on IDCM being enabled.

32. The method of claim 23, further comprising:
   encoding a third syntax element indicating whether an inferred direct coding mode (IDCM) is enabled; and
   encoding a fourth syntax element indicating a quantization parameter (QP) offset for the IDCM based on IDCM being enabled.

33. The method of claim 23, further comprising:
   encoding a lifting_neighbour_bias_xyz syntax element as lifting_neighbour_bias_xyz minus 1, wherein the lifting_neighbour_bias_xyz syntax element specifies a factor used to weight a k-th component of an (x, y, z) point position in a calculation of a Euclidean distance between two points as part of a nearest neighbour derivation process.

34. An apparatus configured to encode a point cloud, the apparatus comprising:
   a memory; and
   one or more processors implemented in circuitry and in communication with the memory, the one or more processors configured to:
      encode a first syntax element indicating a number of bits used to encode one or more second syntax elements, wherein the one or more second syntax elements indicate one or more of an offset of a bounding box, an origin point of the bounding box, a size of the bounding box, or a number of unique segments, and wherein the first syntax element is separate from the one or more second syntax elements; and
      encode the one or more second syntax elements using a fixed length code using the number of bits.

35. The apparatus of claim 34, wherein to encode the first syntax element, the one or more processors are further configured to encode a sequence parameter set (SPS) bounding box bits syntax element that indicates the number of bits used to encode at least one of an SPS bounding box offset syntax element or an SPS bounding box size syntax element, and
   wherein to encode the one or more second syntax elements, the one or more processors are further configured to encode the SPS bounding box offset syntax element or the SPS bounding box size syntax element using the number of bits indicated by the SPS bounding box bits syntax element.

36. The apparatus of claim 34, wherein to encode the first syntax element, the one or more processors are further configured to encode a region delta quantization parameter (QP) bounding box bits syntax element that indicates the number of bits used to encode a region delta QP bounding box origin syntax element and region delta QP bounding box size syntax element, and
   wherein to encode the one or more second syntax elements, the one or more processors are further configured to encode the region delta QP bounding box origin syntax element and the region delta QP bounding box size syntax element using the number of bits indicated by the region delta QP bounding box bits syntax element.

37. The apparatus of claim 34, wherein to encode the first syntax element, the one or more processors are further configured to encode a tile bounding box bits syntax element that indicates the number of bits used to encode a tile bounding box origin syntax element, and
   wherein to encode the one or more second syntax elements, the one or more processors are further configured to encode the tile bounding box origin syntax element using the number of bits indicated by the tile bounding box bits syntax element.

38. The apparatus of claim 34, wherein to encode the first syntax element, the one or more processors are further configured to encode a geometry slice header (GSH) box bits syntax element that indicates the number of bits used to encode a GSH box origin syntax element, and
wherein to encode the one or more second syntax elements, the one or more processors are further configured to encode the GSH box origin syntax element using the number of bits indicated by the GSH box origin bits syntax element.

39. The apparatus of claim 34, wherein to encode the first syntax element, the one or more processors are further configured to encode a number of unique segments bits syntax element that indicates the number of bits used to encode a number of unique segments syntax element, and
wherein to encode the one or more second syntax elements, the one or more processors are further configured to encode the number of unique segments syntax element using the number of bits indicated by the number of unique segments bits syntax element.

40. The apparatus of claim 34, wherein to encode the first syntax element, the one or more processors are further configured to encode an angular coding mode origin bits syntax element that indicates the number of bits used to encode an angular coding mode origin syntax element, and
wherein to encode the one or more second syntax elements, the one or more processors are further configured to encode the angular coding mode origin syntax element based on the number of bits indicated by the angular coding mode origin bits syntax element.

41. The apparatus of claim 34, wherein to encode the first syntax element, the one or more processors are further configured to:
encode the first syntax element using an exponential Golomb code.

42. The apparatus of claim 34, wherein the one or more processors are further configured to:
encode a third syntax element indicating whether an inferred direct coding mode (IDCM) is enabled; and
encode a fourth syntax element indicating a threshold for a planar mode based on IDCM being enabled.

43. The apparatus of claim 34, wherein the one or more processors are further configured to:
encode a third syntax element indicating whether an inferred direct coding mode (IDCM) is enabled; and
encode a fourth syntax element indicating a quantization parameter (QP) offset for the IDCM based on IDCM being enabled.

44. The apparatus of claim 34, wherein the one or more processors are further configured to:
encode a lifting_neighbour_bias_xyz syntax element as lifting_neighbour_bias_xyz minus 1, wherein the lifting_neighbour_bias_xyz syntax element specifies a factor used to weight a k-th component of an (x, y, z) point position in a calculation of a Euclidean distance between two points as part of a nearest neighbour derivation process.

45. An apparatus configured to decode point cloud data, the apparatus comprising:
means for decoding, from a bitstream, a first syntax element indicating a number of bits used to encode one or more second syntax elements, wherein the one or more second syntax elements indicate one or more of an offset of a bounding box, an origin point of the bounding box, a size of the bounding box, or a number of unique segments, and wherein the first syntax element is separate from the one or more second syntax elements;
means for decoding, from the bitstream, the one or more second syntax elements using a fixed length code based on the number of bits indicated by the first syntax element; and
means for decoding the point cloud data based on values of the one or more second syntax elements.

46. A non-transitory computer-readable storage medium storing instructions that, when executed, cause one or more processors configured to decode point cloud data to:
decode, from a bitstream, a first syntax element indicating a number of bits used to encode one or more second syntax elements, wherein the one or more second syntax elements indicate one or more of an offset of a bounding box, an origin point of the bounding box, a size of the bounding box, or a number of unique segments, and wherein the first syntax element is separate from the one or more second syntax elements;
decode, from the bitstream, the one or more second syntax elements using a fixed length code based on the number of bits indicated by the first syntax element; and
decode the point cloud data based on values of the one or more second syntax elements.

47. An apparatus configured to encode point cloud data, the apparatus comprising:
means for encoding a first syntax element indicating a number of bits used to encode one or more second syntax elements, wherein the one or more second syntax elements indicate one or more of an offset of a bounding box, an origin point of the bounding box, a size of the bounding box, or a number of unique segments, and wherein the first syntax element is separate from the one or more second syntax elements; and
means for encoding the one or more second syntax elements using a fixed length code and the number of bits.

48. A non-transitory computer-readable storage medium storing instructions that, when executed, cause one or more processors configured to encode point cloud data to:
encode a first syntax element indicating a number of bits used to encode one or more second syntax elements, wherein the one or more second syntax elements indicate one or more of an offset of a bounding box, an origin point of the bounding box, a size of the bounding box, or a number of unique segments, and wherein the first syntax element is separate from the one or more second syntax elements; and
encode the one or more second syntax elements using a fixed length code using the number of bits.

* * * * *